US007259196B2

(12) United States Patent
Suzuki et al.

(10) Patent No.: US 7,259,196 B2
(45) Date of Patent: *Aug. 21, 2007

(54) POLYAMIDE RESIN COMPOSITION AND PROCESS FOR PRODUCING THE SAME

(75) Inventors: Noriyuki Suzuki, Kawanishi (JP); Kazuhiro Hara, Takarazuka (JP); Yoshitaka Ono, Settsu (JP); Atsushi Miyano, Takatsuki (JP); Tetsuo Mekata, Sanda (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/519,544

(22) PCT Filed: Jul. 23, 2003

(86) PCT No.: PCT/JP03/09306

§ 371 (c)(1),
(2), (4) Date: Dec. 28, 2004

(87) PCT Pub. No.: WO2004/016693

PCT Pub. Date: Feb. 26, 2004

(65) Prior Publication Data

US 2006/0058424 A1 Mar. 16, 2006

(30) Foreign Application Priority Data

| Jul. 23, 2002 | (JP) | ............................ 2002-214446 |
| Oct. 16, 2002 | (JP) | ............................ 2002-301567 |
| Oct. 18, 2002 | (JP) | ............................ 2002-303843 |
| Feb. 25, 2003 | (JP) | ............................ 2003-047358 |

(51) Int. Cl.
C08K 9/04 (2006.01)
C08K 3/34 (2006.01)

(52) U.S. Cl. .................. 523/209; 523/205; 523/216; 524/366; 524/367; 524/370; 524/371; 524/377; 524/445; 524/447; 524/449

(58) Field of Classification Search ........ 524/170–172, 524/366–367, 370–371, 455–449, 377; 523/205, 523/209, 216

See application file for complete search history.

(56) References Cited

U.S. PATENT DOCUMENTS

| 3,134,746 | A | 5/1964 | Garbowski |
| 3,218,371 | A | 11/1965 | Garbowski |
| 3,267,175 | A | 8/1966 | Garbowski |
| 6,583,208 | B1 * | 6/2003 | Suzuki ....................... 524/445 |
| 7,056,963 | B2 * | 6/2006 | Suzuki et al. ............... 523/209 |
| 2001/0031831 | A1 | 10/2001 | Miyoshi et al. |
| 2004/0197561 | A1 | 10/2004 | Suzuki et al. |

FOREIGN PATENT DOCUMENTS

| EP | 1 283 245 A1 | 2/2003 |
| JP | 62-74957 | 4/1987 |
| JP | 63-179957 | 7/1988 |
| JP | 64-158 | 1/1989 |
| JP | 2-69562 | 3/1990 |
| JP | 4-120167 | 4/1992 |
| JP | 4-332758 | 11/1992 |
| JP | 5-43794 | 2/1993 |
| JP | 6-80873 | 3/1994 |
| JP | 6-136259 | 5/1994 |
| JP | 6-200087 | 7/1994 |
| JP | 6-228435 | 8/1994 |
| JP | 6-234896 | 8/1994 |
| JP | 6-248176 | 9/1994 |
| JP | 7-18619 | 4/1995 |
| JP | 7-108619 | 4/1995 |
| JP | 7-205310 | 8/1995 |
| JP | 7-331029 | 12/1995 |
| JP | 8-3439 | 1/1996 |
| JP | 8-134345 | * 5/1996 |
| JP | 8-143768 | 6/1996 |
| JP | 8-283567 | 10/1996 |
| JP | 8-319417 | 12/1996 |
| JP | 9-12873 | 1/1997 |
| JP | 9-118518 | 5/1997 |
| JP | 9-217006 | 8/1997 |
| JP | 9-241505 | 9/1997 |
| JP | 10-237316 | 9/1998 |
| JP | 10-259016 | 9/1998 |
| JP | 10-279752 | 10/1998 |
| JP | 10-310420 | 11/1998 |
| JP | 11-181277 | 7/1999 |
| JP | 11-310701 | 11/1999 |
| JP | 11-349811 | 12/1999 |
| JP | 2000-212431 | 8/2000 |
| JP | 2000-212432 | 8/2000 |

(Continued)

*Primary Examiner*—Peter Szekely
(74) *Attorney, Agent, or Firm*—Kenyon & Kenyon LLP

(57) ABSTRACT

An object of the present invention is to provide a polyamide resin composition having high mechanical properties and high heat resistance while achieving a satisfactory balance between various physical properties. A molded product made of this polyamide resin exhibits a lower warpage and excellent surface appearance. A method for producing the polyamide, resin composition is also provided. The present invention provides a polyamide resin composition containing a polyamide resin and swelling mica treated with a polyether compound having a bisphenol structure. The present invention also provides a method for making the polyamide resin composition including melt-mixing a polyamide resin with a polyether compound.

24 Claims, No Drawings

FOREIGN PATENT DOCUMENTS

| | | |
|---|---|---|
| JP | 2000-290500 | 10/2000 |
| JP | 2001-2913 | 1/2001 |
| JP | 2001-302845 | 10/2001 |
| JP | 2003-41051 | 2/2003 |
| JP | 2003-041051 | 2/2003 |
| WO | WO97/11998 | 4/1997 |
| WO | WO99/23162 * | 5/1999 |
| WO | WO 01/88035 * | 11/2001 |

* cited by examiner

POLYAMIDE RESIN COMPOSITION AND PROCESS FOR PRODUCING THE SAME

This is a 371 national phase application of PCT/JP2003/009306 filed 23 Jul. 2003, claiming priority to Japanese Application Nos. 2002-214446 filed 23 Jul. 2002, 2002-301567 filed 16 Oct. 2002, No. 2002-303843 filed 18 Oct. 2002, and 2003-47358 filed 25 Feb. 2003, the contents of which are incorporated herein by reference in their entireties.

TECHNICAL FIELD

The present invention relates to polyamide resin compositions containing polyamide resins and swelling mica treated with particular polyether compounds.

BACKGROUND ART

Polyamide resins have high resistance to heat, chemicals, and weathering and exhibits, for example, excellent mechanical and electrical properties. Polyamide resins are thus used in various industrial applications, such as injection molding materials, fibers, and films.

However, polyamide resins are highly crystalline. When they are formed into a thin product, a complex-shaped product having nonuniform thickness, or the like by injection molding, the product suffers from problems such as warpage resulting in deformation of the product. In order to overcome such problems, in general, incorporation of various inorganic particles has been attempted for improvement. However, this approach also has a problem such as low surface appearance of the product or orientation of fibrous inorganic substances resulting in anisotropy and thus deformation of the product.

Such problems of inorganic particles are presumably caused by insufficient dispersibility of inorganic particles or excessive size of dispersed particles. A technique for finely dispersing inorganic particles has been desired.

Japanese Unexamined Patent Application Publication Nos. 62-74957, 2-69562, 6-80873, 6-228435, 11-349811, 6-248176, 8-283567, 9-241505, and 2001-2913 disclose polyamide resin compositions containing swelling clay compounds, i.e., inorganic particles, finely dispersed in polyamide resins. In these techniques, swelling clay compounds, such as montmorillonite, are added during the polymerization for polyamide resins. However, clay compounds increase the melt viscosity of the polymer, thereby causing agitation failure during the polymerization. Thus, the amounts of clay compounds that can be used in the polymerization process are as small as approximately several percent, and this has limited the scope of the product design. Moreover, in order to compound auxiliary materials such as a flame retarder and a stabilizer, additional steps are necessary or the process becomes complicated. An improvement as to these points is also desired.

Another problem of the above-described techniques is the use of organic ammonium salts as a surface treatment agent for achieving homogeneous, fine dispersion of swelling clay compounds. Organic ammonium salts retained at a temperature for processing polyamide resins for a long time undergo deterioration, thereby degrading the properties such as mechanical properties or toughness. This problem must also be overcome.

Japanese Unexamined Patent Application Publication Nos. 8-319417, 2000-212432, 2000-290500, and 2001-302845 and International Publication No. 97-11998 disclose polyamide resin compositions containing swelling clay compounds finely dispersed in polyamide resins by extrusion. However, in these inventions, dispersion is insufficient, and thus the properties are not sufficiently improved. Moreover, the use of organic ammonium salts as a surface treatment agent for clay compounds may lead to deterioration during the processing and may degrade the properties such as mechanical properties or toughness. Among the above-described inventions, the invention set forth in Japanese Unexamined Patent Application Publication No. 2000-212432 requiring end-capped nylon and the invention set forth in International Publication No. 97-11998 requiring organic ammonium salts having bicyclo rings are not suitable for industrial applications.

Japanese Unexamined Patent Application Publication No. 9-118518 discloses a technique for facilitating fine dispersion by rendering layers of swelling clay compounds readily cleavable. In this technique, a polymeric compound (intercalant polymer), such as polyvinylpyrrolidone, is intercalated between layers of sheet silicate to prepare an intercalation compound. However, although this invention provides the intercalation compound, it does not provide a technique of cleaving the intercalation compound and finely dispersing the cleaved intercalation compound into a polyamide resin. It has been difficult to finely disperse a swelling clay compound into a polyamide resin.

Japanese Unexamined Patent Application Publication Nos. 10-259016 and 10-310420 disclose that, in order to cleave a layered swelling clay compound so that it can be finely dispersed in a thermoplastic resin, it is particularly effective to treat the swelling clay compound with a water-soluble compound to convert the compound into an intercalation clay compound. According to this technique, the elastic modulus and heat resistance can be improved without impairing surface appearance. However, further improvements on various properties and on warpage that occurs during injection molding are strongly desired.

As is apparent from the above, there has been no technique of homogeneously and finely dispersing a swelling clay compound in a polyamide resin by a simple process, such as melt-kneading, to obtain a polyamide resin composition having excellent properties.

In order to overcome problems arising from high crystallinity of polyamide resins, e.g., the problem of warpage and deformation that occurs in a thin product or a complex-shaped product with nonuniform thickness produced by injection molding, various approaches other than the use of inorganic particles have been attempted. Examples thereof include alloying of a polyamide resin with a noncrystalline resin, such as a polycarbonate resin, a styrene resin, or a polyphenylene resin. However, this results in degradation of surface appearance or heat resistance of the product, or in deformation of the product due to the anisotropy generated by orientation of fibrous inorganic substances.

An example of alloying a polyamide resin with a styrene resin is disclosed in Japanese Examined Patent Application Publication No. 38-23476 in which a polyamide resin is alloyed with an ABS resin to prepare a polyamide/ABS alloy. Examples of the method for improving the compatibility between a polyamide resin and an ABS resin are disclosed in Japanese Unexamined Patent Application Publication Nos. 63-179957 and 64-158, in which a modified copolymer prepared by copolymerization of styrene and acrylonitrile with an unsaturated carboxylic acid is blended. The alloying method using an inorganic filler and a particular type of styrene resin is disclosed in Japanese Unexamined Patent Application Publication Nos. 4-120167, 4-332758, 8-143768, and 9-217006. The method using a combination of ABS and polyamide prepared by polymerization in the presence of lamellar silicate is disclosed in Japanese Unexamined Patent Application Publication No. 8-3439. The method using a combination of talc, a particular styrenic compound, and a polyamide containing finely dispersed lamellar silicate is disclosed in Japanese Unexamined Patent Application Publication No. 2000-212431. The method using a combination of a thermoplastic elastomer, a styrenic rigid polymer, and a polyamide containing a swelling fluorine mica-type mineral is disclosed in Japanese Unexamined Patent Application Publication No. 9-12873.

However, none of these techniques can simultaneously yield satisfactory surface appearance, deformation properties, heat resistance, and mechanical properties. For example, according to these techniques, the surface appearance (surface quality and low sink-mark formation) is not sufficient, the mechanical properties or thermal properties are degraded by water absorption, or heat resistance is low.

As is described above, polyamide resins are used in various fields. However, polyamide resins have high water absorption and thus tend to exhibit degraded properties once they absorb water. An approach for reducing the water absorption known in the art is to blend polyamide resins with less water-absorbing resins, such as polyolefin resins (Japanese Unexamined Patent Application Publication Nos. 05-043794 and 06-136259; Fumio IDE, Kazumasa KAMATA, Akira HASEGAWA, "Kobunshi Kagaku [Macromolecular chemistry]" The Society of Polymer Science, Japan, Feb. 25, 1968, vol. 25, No. 274, pp. 107-115). However, the polymer blending sometimes results in low heat resistance or lower stiffness. An approach for maintaining the stiffness known in the art is to add fibrous reinforcing materials or inorganic fillers (Japanese Unexamined Patent Application Publication Nos. 06-200087, 06-234896, and 07-108619). However, addition of fiber reinforcing materials results in warpage or deformation of the product due to anisotropy, and addition of inorganic fillers results in low surface quality. An approach for maintaining the surface quality is to add swelling silicate treated with ammonium salts (Japanese Unexamined Patent Application Publication Nos. 10-279752 and 11-181277). However, ammonium salts have low resistance to heat and thus undergo heat deterioration when subjected to heating for a long time at a temperature of processing polyamide resins, thereby resulting in deficiencies such as coloring.

As described above, there has been no technique of producing polyamide resin materials that show satisfactory surface quality, low warpage, high stiffness, and low water absorption without causing heat deterioration, such as coloring, during the melt processing of polyamide resins.

Recent development in electronic technology has led to an increase in demand for electrostatic recording sheets; housings for electronic devices; electrostatic containers; electrostatic films; floor covering, wall materials, and partitions for clean rooms; covering materials for electronic devices; and magazines for ICs and the like. The materials used therefor must satisfy the required dimensional accuracy, low warpage, surface quality, high stiffness, and heat resistance. Furthermore, since polyamide resins have excellent heat resistance, mechanical properties, and the like, they are used in many industrial applications, such as materials for injection molding, sheets, and films. However, polyamide resins readily become electrostatically charged and thus cannot be directly applied to films, sheets, and containers composed of boards because accumulation of electrostatic charge should be avoided. Accordingly, a technique of rendering electric conductivity to synthetic resins is widely employed. In general, for example, carbon fibers (Japanese Unexamined Patent Application Publication Nos. 7-205310 and 10-237316) and carbon black (Japanese Unexamined Patent Application Publication Nos. 11-310701 and 7-331029) are used.

However, when products are fabricated using materials containing carbon fibers for rendering conductivity, carbon fibers frequently appear in the surfaces of the products. Thus, when such products are used as containers or transfer trays, the surfaced carbon fibers will damage ICs and other electronic components. Furthermore, during molding, carbon fibers align in the direction of flow, thereby generating anisotropy. This leads to another problem, i.e., warpage in the molded products. When carbon black is used, inorganic fillers are used to provide stiffness and heat resistance; however, inorganic fillers decrease surface quality and cause warpage.

As is stated above, a technique that can provide conductive polyamide resin compositions having excellent heat resistance, stiffness, and surface quality while achieving low warpage has not been found so far.

DISCLOSURE OF INVENTION

An object of the present invention is to overcome the above-described problems experienced in the conventional art by providing a polyamide resin composition having high dimensional stability, satisfactory mechanical properties, and high heat resistance.

Another object of the present invention is to provide a thermoplastic resin composition having superior surface appearance (surface quality and low sink mark formation); a thermoplastic resin composition having low water absorption; or a thermoplastic resin composition having an antistatic property.

The present inventors have conducted extensive investigations to achieve these objects and completed the invention by providing a polyamide resin composition with superior properties, in which swelling mica treated with a particular polyether compound is finely and homogeneously dispersed in a polyamide resin by extrusion.

The present inventors have also made a thermoplastic resin composition having superior properties, in which swelling mica treated with a particular polyether compound is finely and homogeneously dispersed, by extrusion, in a resin composition composed of a polyamide resin and a styrene resin.

The present inventors have also found that a polyamide resin composition comprising anhydride-containing olefin copolymer and swelling mica treated with a particular polyether compound can exhibit excellent properties, and thus completed the present invention.

The present inventors have also completed a polyamide resin composition having excellent properties, the polyamide resin composition containing a carbon compound and being prepared by finely and homogeneously dispersing, by extrusion, swelling mica treated with a particular polyether compound.

In particular, the present invention provides a polyamide resin composition comprising a polyamide resin and swelling mica treated with a polyether compound, wherein the polyether compound is represented by general formula (1):

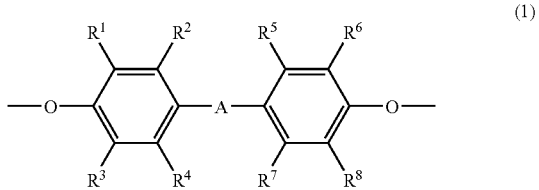
(1)

(wherein -A- represents —O—, —S—, —SO—, —SO$_2$—, —CO—, an alkylene group having 1 to 20 carbon atoms, or alkylidene group having 6 to 20 carbon atoms; and R$^1$, R$^2$, R$^3$, R$^4$, R$^5$, R$^6$, R$^7$, and R$^8$ may be the same or different and each represent a hydrogen atom, a halogen atom, or a monovalent hydrocarbon group having 1 to 5 carbon atoms).

The present invention provides the polyamide resin composition further comprising at least one of a styrene resin, an anhydride-containing olefin copolymer, and a carbon compound.

The present invention provides the polyamide resin composition further comprising a styrene resin.

The present invention provides the polyamide resin composition further comprising an anhydride-containing olefin copolymer; the polyamide resin composition in which the anhydride-containing olefin copolymer is obtained by copolymerization or graft reaction of olefin or an olefin copolymer with an alicyclic dicarboxylic anhydride having a cis double bond in the ring or an α,β-unsaturated dicarboxylic anhydride; the polyamide resin composition in which the content of the anhydride-containing olefin copolymer in the polyamide resin composition is in the range of 1 to 30 percent by weight.

The present invention also provides the polyamide resin composition further comprising a carbon compound; the polyamide resin in which the carbon compound is in the form of particles; and the polyamide resin in which the carbon compound is fibrous.

In a preferred embodiment of the polyamide resin composition, the polyether compound is represented by general formula (2):

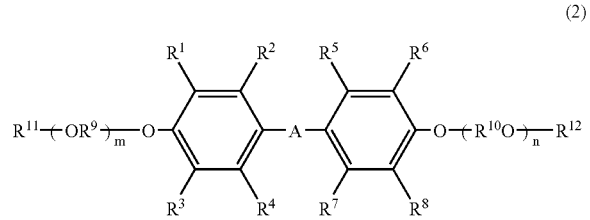
(2)

(wherein A, R$^1$, R$^2$, R$^3$, R$^4$, R$^5$, R$^6$, R$^7$, and R$^8$ are the same as above; R$^9$ and R$^{10}$ may be the same or different and each represent a divalent hydrocarbon group having 1 to 5 carbon atoms; R$^{11}$ and R$^{12}$ may be the same or different and each represent a hydrogen atom or a monovalent hydrocarbon group having 1 to 20 carbon atoms; m and n each represent the number of oxyalkylene repeating units; and $2 \leq m+n \leq 50$).

In a more preferred embodiment of the polyamide resin composition, the ratio of the swelling mica having an equivalent circular diameter [D] of 300 nm or less in the composition is 20% or more.

In a yet more preferred embodiment of the polyamide resin composition, the average of the equivalent circular diameter [D] of the swelling mica in the polyamide resin composition is 500 nm or less.

In another preferred embodiment of the polyamide resin composition, the average layer thickness of the swelling mica in the polyamide resin composition is 50 nm or less.

In another preferred embodiment of the polyamide resin composition, the maximum layer thickness of the swelling mica in the polyamide resin composition is 200 nm or less.

In another preferred embodiment of the polyamide resin composition, the number [N] of particles of the swelling mica in the polyamide resin composition is 30 or more per unit weight ratio.

In another preferred embodiment of the polyamide resin composition, the average aspect ratio (layer length/layer thickness) of the swelling mica in the polyamide resin composition is 10 to 300.

In another preferred embodiment of the polyamide resin composition, the content of the swelling mica in the polyamide resin composition is in the range of 0.5 to 30 percent by weight.

In another preferred embodiment of the polyamide resin composition, the polyamide resin composition is prepared by mixing the components described above.

The present invention also provides a method for making a polyamide resin composition, comprising melt-mixing the above-described components of the polyamide resin composition.

The present invention also provides a molded resin article entirely or partially composed of the polyamide resin composition described above; and the molded resin article used in automobile parts.

DETAILED DISCLOSURE OF THE INVENTION

In the present invention, polyamide resins used are polymers that contain amide bonds (—NHCO—) in the main chains and melt by heating. Examples of such polyamide resins include polycaproamide (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecanamide (nylon 11), polydodecaneamide (nylon 12), polytrimethylhexamethylene terephthalamide (nylon TMHT), polyhexamethylene isophthalamide (nylon 6I), polyhexamethylene terephthal/isophthalamide (nylon 6T/6I), polynonamethylene terephthalamide (nylon 9T), polybis(4-aminocyclohexyl)methane dodecamide (nylon PACM12), polybis(3-methyl-4-aminocyclohexyl)methane dodecamide (nylondimethyl PACM12), polymetaxylylene adipamide (nylon MXD6), polyundecamethylene terephthalamide (nylon 11T), polyundecamethylene hexahydroterephthalamide (nylon 11T(H)), and copolymers and mixtures of these polyamides.

Among these, nylon 6, nylon 46, nylon 66, nylon 11, nylon 12, nylon 9T, nylon MXD6, and copolymers and mixtures of these polyamides are preferred from the standpoints of ready availability, handling ease, and the like. Nylon 6, nylon 46, nylon 66, and nylon MXD6 are more preferable from the standpoints of strength, modulus of elasticity, cost, and the like.

The molecular weights of these polyamide resins are not particularly limited. In general, polyamide resins having relative viscosities of 0.5 to 5.0 measured in conc. H$_2$SO$_4$ at 25° C. are preferred.

These polyamide resins may be used alone. Alternatively, two or more of these polyamide resins having different compositions or components and/or different relative viscosities may be used.

These polyamide resins may be produced by typical polymerization of polyamides, for example.

In the present invention, polyether-treated swelling mica is used. In this manner, the swelling mica can be finely dispersed in a polyamide resin composition by forming lamellae independent from one another.

The swelling mica used in the present invention may be produced by heating a mixture of talc and a silicofluoride or fluoride of sodium and/or lithium. A specific production method is disclosed in Japanese Unexamined Patent Application Publication No. 2-149415. In this method, talc is subjected to intercalation of a sodium ion and/or a lithium ion to obtain swelling mica. In particular, talc is mixed with a silicofluoride and/or a fluoride, and the resulting mixture is treated at approximately 700° C. to 1,200° C. to obtain swelling mica. In the present invention, swelling mica produced by this method is particularly preferable from the standpoints of purity and swelling property. In order to obtain swelling mica, sodium or lithium must be the metal contained in the silicofluoride or the fluoride. These may be used alone or in combination.

From the standpoint of yield of swelling mica, the total content or the content of the silicofluoride and/or the fluoride mixed with talc is preferably 10 to 35 percent by weight of the entirety of the mixture.

The swelling silica produced by the above-described method has a structure represented by general formula (3) below:

α(MF)·β(aMgF$_2$·bMgO)·γSiO$_2$      (3)

(wherein M represents sodium or lithium; α, β, γ, a, and b each represent a coefficient; $0.1 \leq \alpha \leq 2$; $2 \leq \beta \leq 3.5$; $3 \leq \gamma \leq 4$; $0 \leq a \leq 1$; $0 \leq b \leq 1$; and a+b=1).

Alternatively, it is possible to add a small amount of alumina (Al$_2$O$_3$) during the process of producing the swelling mica used in the present invention so as to control the swelling property of the resulting swelling mica.

This swelling mica swells in water, polar solvents miscible with water at arbitrary ratios, and mixed solvents containing water and any of these polar solvents. In this invention, "swelling property" refers to the property of mica to absorb polar molecules between the layers, thereby increasing the interlayer distance or to extensively swell, thus leading to cleaving. Examples of the polar solvents miscible with water at arbitrary ratios are the same as the examples of polar solvents described below.

Examples of the swelling mica include lithium taeniolite, sodium taeniolite, lithium tetrasilicic mica, sodium tetrasilicic mica, substitution products thereof, derivatives thereof, and mixtures thereof. These can be produced by the method described above.

The swelling mica in an initial aggregation state, i.e., before swelling, has a basal-plane spacing of approximately 1 to 1.7 nm and an average particle diameter of approximately 100 to 100,000 nm.

The polyether compound used in the present invention includes a structure represented by general formula (1) in the side chain and/or the main chain of a polyoxyalkylene compound such as polyoxyethylene or a polyoxyethylene-polyoxypropylene copolymer:

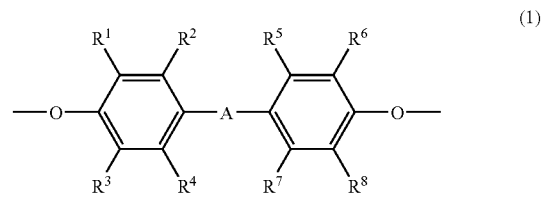

(wherein -A- represents —O—, —S—, —SO—, —SO$_2$—, —CO—, an alkylene group having 1 to 20 carbon atoms, or an alkylidene group having 6 to 20 carbon atoms; and $R^1$, $R^2$, $R^3$, $R^4$, $R^5$, $R^6$, $R^7$, and $R^8$ may be the same or different and each represent a hydrogen atom, a halogen atom, or a monovalent hydrocarbon group having 1 to 5 carbon atoms).

Among the above-described polyether compounds, those having a structure represented by general formula (2) below are preferred from the standpoints of thermal stability, dispersibility of the swelling mica, and ready availability:

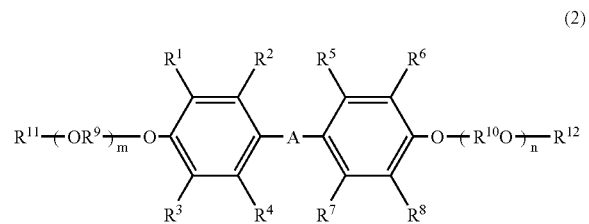

(wherein A, $R^1$, $R^2$, $R^3$, $R^4$, $R^5$, $R^6$, $R^7$, and $R^8$ are the same as above; $R^9$ and $R^{10}$ may be the same or different and each represent a divalent hydrocarbon group having 1 to 5 carbon atoms; $R^{11}$ and $R12$ may be the same or different and each represent a hydrogen atom or a monovalent hydrocarbon group having 1 to 20 carbon atoms; m and n each represent the number of oxyalkylene repeating units; and $2 \leq m+n \leq 50$).

Examples of the alkylene group having 1 to 20 carbon atoms represented by A above include methylene, ethylene, propylene, phenylmethylene, 1-methyl-1-phenylmethylene, and cyclohexylmethylene. Alkylene groups having 1 to 8 carbon atoms are preferred.

Examples of the alkylidene group having 6 to 20 carbon atoms represented by A include cyclohexylidene, methylcyclohexylidene, dimethylcyclohexylidene, and trimethylcyclohexylidene. Alkylidene groups having 6 to 9 carbon atoms are preferred.

Examples of the halogen atom represented by $R^1$ to $R^8$ include a fluorine atom, a chlorine atom, a bromine atom, and an iodine atom.

Examples of the monovalent hydrocarbon group having 1 to 5 carbon atoms represented by $R^1$ to $R^8$ include alkyl groups having 1 to 5 carbon atoms. Examples of the alkyl group having 1 to 5 carbon atoms include methyl, ethyl, propyl, butyl, and pentyl.

Examples of the divalent hydrocarbon groups having 1 to 5 carbon atoms represented by $R^9$ and $R^{10}$ include alkylene groups having 1 to 5 carbon atoms. Examples of the alkylene groups having 1 to 5 carbon atoms include methylene, ethylene, propylene, butylene, and pentylene.

Examples of the monovalent hydrocarbon groups having 1 to 20 carbon atoms represented by $R^{11}$ and $R^{12}$ include alkyl groups having 1 to 20 carbon atoms. Examples of the groups having 1 to 20 carbon atoms include methyl, ethyl, propyl, butyl, pentyl, hexyl, octyl, decyl, dodecyl, and hexadecyl.

In formula (2), m and n each represent the number of oxyalkylene repeating units and satisfy the relationships: $m \geq 1$, $n \geq 1$, and $2 \leq m+n \leq 50$.

Examples of the polyether compounds specifically include 2,2-bis(4-hydroxyphenyl)propane ("bisphenol A") containing a polyoxyethylene chain of 1 to 25 repeating units added to each of the termini; 2,2-bis(4-hydroxyphenyl)propane ("bisphenol A") containing a polyoxypropylene chain of 1 to 25 repeating units added to each of the termini; bis(4-hydroxyphenyl)methane containing a polyoxyethylene chain of 1 to 25 repeating units added to each of the termini; bis(4-hydroxyphenyl)methane containing a polyoxypropylene chain of 1 to 25 repeating units added to each of the termini; 1,1-bis(4-hydroxyphenyl)ethane containing a polyoxyethylene chain of 1 to 25 repeating units added to each of the termini; 1,1-bis(4-hydroxyphenyl)ethane containing a polyoxypropylene chain of 1 to 25 repeating units added to each of the termini; 1,1-bis(4-hydroxyphenyl)-3,3,5-trimethylcyclohexane ("bisphenol TMC") containing a polyoxyethylene chain of 1 to 25 repeating units added to each of the termini; 1,1-bis(4-hydroxyphenyl)-3,3,5-trimethylcyclohexane ("bisphenol TMC") containing a polyoxypropylene chain of 1 to 25 repeating units added to each of the termini; bis(4-hydroxyphenyl)cyclohexylmethane containing a polyoxyethylene chain of 1 to 25 repeating units added to each of the termini; bis(4-hydroxyphenyl)cyclohexylmethane containing a polyoxypropylene chain of 1 to 25 repeating units added to each of the termini; bis(4-hydroxy-3,5-dimethylphenyl)methane containing a polyoxyethylene chain of 1 to 25 repeating units added to each of the termini; bis(4-hydroxy-3,5-dimethylphenyl)methane containing a polyoxypropylene chain of 1 to 25 repeating units added to each of the termini; 2,2-bis(4-hydroxy-3,5-dimethylphenyl)propane containing a polyoxyethylene chain of 1 to 25 repeating units added to each of the termini; 2,2-bis(4-hydroxy-3,5-dimethylphenyl)propane containing a polyoxypropylene chain of 1 to 25 repeating units added to each of the termini; bis(4-hydroxyphenyl)sulfone containing a polyoxyethylene chain of 1 to 25 repeating units added to each of the termini; bis(4-hydroxyphenyl)sulfone containing a polyoxypropylene chain of 1 to 25 repeating units added to each of the termini; bis(4-hydroxyphenyl)sulfide containing a polyoxyethylene chain of 1 to 25 repeating units added to each of the termini; and bis(4-hydroxyphenyl)sulfide containing a polyoxypropylene of 1 to 25 repeating units added to each of the termini.

Among these, 2,2-bis(4-hydroxyphenyl)propane ("bisphenol A") containing a pentaethyleneoxide chain added to each of the termini, 2,2-bis(4-hydroxyphenyl)propane ("bisphenol A") containing a nonaethyleneoxide chain added to each of the termini, 2,2-bis(4-hydroxyphenyl)propane ("bisphenol A") containing a decapropyleneoxide chain added to each of the termini, 1,1-bis(4-hydroxyphenyl)-3,3,5-trimethylcyclohexane ("bisphenol TMC") containing a nonaethyleneoxide chain added to each of the termini, and bis(4-hydroxyphenyl)methane containing a nonaethyleneoxide chain added to each of the termini are preferred from the standpoints of ready availability and handling ease.

The above-described polyether compounds may contain a substituent or substituents. In particular, the divalent hydrocarbon groups having 1 to 5 carbon atoms represented by $R^9$ and $R^{10}$ may further contain a substituent or substituents.

The substituents are not particularly limited but should not adversely affect the polyamide resins or the swelling mica described above. Examples of the substituents include saturated or unsaturated monovalent or multivalent aliphatic hydrocarbon groups (e.g. alkyl and alkenyl groups); groups containing ester bonds (e.g., alkyl ester groups); an epoxy group; an amino group; a carboxyl group; carbonyl-terminated groups; an amide group; a mercapto group; groups containing sulfonyl bonds; groups containing sulfinyl bonds; a nitro group; a nitroso group; a nitrile group; halogen atoms (fluorine, chlorine, bromine, and iodine atoms); and a hydroxyl group. The polyether compounds may be substituted with one of these or two or more of these.

The content of the substituent in the polyether compound is not particularly limited as long as the polyether compound is soluble in water or a polar solvent containing water. In particular, the solubility of the polyether compound is preferably 1 g or more, more preferably 2 g or more, yet more preferably 5 g or more, still more preferably 10 g or more, and most preferably 20 g or more in 100 g of water at room temperature.

Examples of the polar solvent include alcohols such as methanol, ethanol, and isopropanol; glycols such as ethylene glycol, propylene glycol, and 1,4-butanediol; ketones such as acetone and methyl ethyl ketone; ethers such as diethyl ether and tetrahydrofuran; amide compounds such as N,N-dimethylformamide and N,N-dimethylacetamide; carbonic acid diesters such as dimethyl carbonate and diethyl carbonate; pyridine; dimethylsulfoxide; and N-methylpyrrolidone. These polar solvents may be used alone or in combination.

The amount of the polyether compound used can be adjusted to enhance the affinity between the swelling mica and the polyamide resin and to sufficiently improve the dispersibility of the swelling mica in the polyamide resin composition. If necessary, two or more polyether compounds having different functional groups may be used simultaneously. Thus, the amount of the polyether compound used cannot be limited by specific numerical values; however, from the standpoint of achieving fine dispersion of the swelling mica, the lower limit of the amount of the polyether compound to 100 parts by weight of the swelling mica is preferably 1 part by weight, more preferably 2 parts by weight, and most preferably 5 parts by weight. The upper limit of the amount of the polyether compound to 100 parts by weight of the swelling mica is not particularly limited but is preferably 200 parts by weight from the standpoint of achieving fine dispersion of the swelling mica.

In the present invention, the process for treating the swelling mica with the polyether compound is not particularly limited. For example, the method described below may be employed.

First, swelling mica and a dispersion medium are mixed. Here, the dispersion medium is either water or a polar solvent containing water. Examples of the polar solvent containing water are the same as those described above as the examples of the polar solvent.

The method for mixing the swelling mica and the dispersion medium is not particularly limited. For example, the mixing may be performed using a conventional wet mixer. Examples of the wet mixer include high performance mixers having mixing blades rotating at high speeds; wet mills for wet-milling samples in the gaps between rotors and stators at high shear rate; mechanical pulverizers for wet processes using hard media; impact pulverizers for wet processes, in which samples are collided at high speeds using jet nozzles and the like; and ultrasonic pulverizers for wet processes using ultrasonic waves.

In order to achieve more efficient mixing, the number of revolutions for mixing may be increased to 1,000 rpm or more, preferably 1,500 rpm or more, and more preferably 2,000 rpm or more. Alternatively, the shear rate may be increased to 500 (1/s) or more, preferably 1,000 (1/s) or more, and more preferably 1,500 (1/s) or more. The upper limit of the number of revolutions is approximately 25,000 rpm, and the upper limit of the shear rate is approximately 500,000 (1/s). Since mixing or application of shear beyond the upper limits does not improve the mixing efficiency, there is no need to conduct mixing beyond the upper limits. Moreover, the time taken for mixing is preferably 10 minutes or more.

Next, the polyether compound is added, and the mixing is further continued to thoroughly mix the components.

The mixing may be performed with a conventional mixer. Mixers are classified into batch mixers and continuous mixers. Examples of the batch mixers include open-type rollers, closed-type banbury mixers, and kneader-type mixers. Examples of the continuous mixers include single-shaft rotor mixers, twin-shaft rotor mixers, single-shaft screw mixers, twin-shaft screw mixers, and multishaft screw mixers. After the mixing, drying and, if necessary, powdering may be performed.

The lower limit of the ash content in the polyamide resin composition derived from the swelling mica is preferably adjusted to 0.5 percent by weight and more preferably 1.0 percent by weight to improve mechanical properties and reduce warpage. The upper limit of the ash content is preferably adjusted to 30 percent by weight, more preferably 25 percent by weight, yet more preferably 20 percent by weight, and most preferably 15 percent by weight from the standpoint of surface appearance of the resulting product. The ash content may be determined according to Japanese Industrial Standards K 7052.

The ash content in the polyamide resin composition derived from the swelling mica corresponds to the weight ratio of the swelling mica to the polyamide resin composition (the weight of the polyether compound used in treating the swelling mica is not included).

The structure of the swelling mica dispersed in the polyamide resin composition of the present invention is completely different from the structure of the swelling mica before use. Whereas the swelling mica before the use has micrometer-order aggregated structures consisting of many thin layers, the swelling mica after treatment with the polyether forms independent fine segments as a result of cleaving of the layers. Consequently, the swelling mica becomes dispersed in the polyamide resin composition by forming significantly fine lamellae independent from one another. The number thereof is markedly larger than the number of the swelling mica particles before the use. Such a state of dispersion of the lamellar swelling mica can be expressed by the equivalent circular diameter [D], the number of dispersed particles, the maximum layer thickness, the average layer thickness, and the aspect ratio (layer length/layer thickness).

The equivalent circular diameter [D] is defined as the diameter of a circle having the equivalent area as the particle of the swelling mica dispersed in various shapes observed in a micrograph or the like. Of the swelling mica particles dispersed in the polyamide resin composition, those having an equivalent circular diameter [D] of 300 nm or less is preferably contained in an amount of 20% or more, more preferably 35% or more, yet more preferably 50% or more, and most preferably 65% or more from the standpoints of improving the mechanical properties of the polyamide resin composition and reducing the warpage. The upper limit is not particularly limited but is preferably 100%.

In the polyamide resin composition of the present invention, the average of the equivalent circular diameters [D] of the swelling mica is preferably 500 nm or less, more preferably 450 nm or less, yet more preferably 400 nm or less, and most preferably 350 nm or less from the standpoint of improving the mechanical properties of the polyamide resin composition, warpage reduction, and surface appearance of the resulting product. The lower limit is not particularly limited. Since no improvement occurs below 10 nm, there is no need to adjust the average equivalent circular diameter to below 10 nm.

The equivalent circular diameter [D] may be determined by obtaining a picture of a melt-mixed material, an injection-molded product, or a heat-pressed product using a microscope or the like, arbitrarily selecting from the picture a particular region containing 100 or more of layers of swelling mica, and performing image processing using an image processor or the like so as to allow computer processing for quantitative determination.

Here, the number of the dispersed particles per unit weight ratio of the swelling mica found in an area of 100 $\mu m^2$ of the polyamide resin composition is defined as [N] value. The [N] value of the swelling mica in the polyamide resin composition of the present invention is preferably 30 or more, more preferably 45 or more, and most preferably 60 or more. The upper limit is not particularly limited. However, the effect does not change at [N] values exceeding about 1,000; thus, there is no need to increase the [N] value to over 1,000.

For example, [N] values are determined as follows: From a polyamide resin composition, a very thin slice approximately 50 to 100 µm in thickness is cut. A picture of the slice is taken by transmission electron microscopy (TEM) or the like, and the number of particles of the swelling mica found in a desired 100 $\mu m^2$ region in the picture is counted. The number is divided by the weight ratio of the swelling mica used. Alternatively, the [N] value can be determined by selecting a desired region (whose area is measured in advance) containing more than 100 particles from a TEM micrograph, dividing the number of the swelling mica particles in that region by the weight ratio of the swelling mica used, and converting the obtained value to a 100 $\mu m^2$ equivalent so as to define this converted value as the [N] value. Thus, the [N] values can be determined by using TEM micrographs or the like of the polyamide resin composition.

The average layer thickness is defined as the number-average value of the thickness of the layers of the dispersed lamellar swelling mica. Here, the upper limit of the average thickness of the swelling mica in the polyamide resin composition is preferably 50 nm or less, more preferably, 45 nm or less, and most preferably 40 nm or less from the standpoint of improving the mechanical properties and the like of the polyamide resin composition. The lower limit of the average layer thickness is not particularly limited. However, since no change in effects occurs below 5 nm, there is no need to reduce the average layer thickness to 5 nm or less.

The maximum layer thickness is defined as the maximum thickness of the layers of the lamellar swelling mica dispersed in the polyamide resin composition of the present invention. Here, the upper limit of the maximum layer thickness is preferably 200 nm or less, more preferably 180 nm or less, and most preferably 150 nm or less from the standpoints of mechanical properties and surface appearance of the polyamide resin composition. The lower limit of the maximum layer thickness of the swelling mica is not particularly limited but is preferably at least 10 nm, more preferably at least 15 nm, and most preferably at least 20 nm.

The average aspect ratio is defined as the number-average of the ratio, layer length/layer thickness, of the swelling mica dispersed in the resin. The lower limit of the average aspect ratio of the swelling mica in the polyamide resin composition of the present invention is preferably 10, more preferably 20, and most preferably 30 from the standpoint of improving mechanical properties and the like of the polyamide resin composition. Since the effect does not change at average aspect ratios exceeding 300, there is no need to increase the average aspect ratio to beyond 300. Thus, the preferable range of the average aspect ratio is 10 to 300.

The layer thickness and the layer length can be determined from a micrograph or the like of a film prepared by heat-press-molding or draw-molding a polyamide resin composition of the present invention melted by heating or from a picture of a thin product prepared by injection-molding using a molten resin. In particular, assume that a film prepared as above or an injection-molded thin, flat specimen having a thickness of approximately 0.5 to 2 mm is placed on the X-Y plane. From this film or the specimen, a very thin slice having a thickness of approximately 50 to 100 µm is cut out along a plane parallel to the X-Z plane or the Y-Z plane, and this slice is observed at high magnifications of about ×40,000 to 100,000 or more by transmission electron microscopy or the like to determine these values. Alternatively, these values can be determined by arbitrarily selecting a region containing 100 or more particles of the swelling mica from a TEM micrograph taken as in the above and performing the image processing to allow computer processing for quantitative determination. Alternatively, a ruler or the like may be used for the determination.

The polyamide resin composition of the present invention may contain at least one of a styrene resin, an anhydride-containing olefin copolymer, and a carbon compound, in addition to the polyamide resin and the swelling mica treated with the polyether compound described above.

First, the polyamide resin composition of the present invention containing a styrene resin in addition to the polyamide resin and the above-described swelling mica treated with the polyether compound will be described below. Addition of a styrene resin further improves the surface appearance (surface quality and low sink mark formation).

Examples of the styrene resins used in the present invention include, but are not limited to, polystyrene, rubber-modified polystyrene (HIPS resin), styrene-acrylonitrile copolymers, and styrene-rubber polymer-acrylonitrile copolymers. Examples of the styrene-rubber polymer-acrylonitrile copolymers include acrylonitrile-butadiene-styrene (ABS) resins, acrylonitrile-ethylene-propylene-diene-styrene (AES) resins, acrylonitrile-acrylstyrene (AAS) resins, and acrylonitrile-chlorinated polyethylene-styrene (ACS) resins. These resins may be used alone or in combination.

Examples of the resins further include the above-described styrene resins having part of styrene and/or part or all of acrylonitrile substituted with a vinyl monomer copolymerizable with styrene. Examples of the vinyl monomer copolymerizable with styrene include α-methylstyrene, p-methylstyrene, and p-tert-butylstyrene; (meth)acrylates such as methyl (meth)acrylate, ethyl (meth)acrylate, propyl (meth)acrylate, and n-butyl (meth)acrylate; maleimide monomers such as maleimide, N-methylmaleimide, N-cyclohexylmaleimide, and N-phenylmaleimide; unsaturated carboxylic monomers such as acrylic acid, methacrylic acid, maleic acid, fumaric acid, and itaconic acid. These resins may be used alone or in combination.

ABS resins, polystyrenes, HIPS resins, AES resins, AAS resins, ACS resins, methacrylate-butadiene-styrene (MBS) resins, and the like are preferred. ABS resins and polystyrenes each having part of styrene substituted with an unsaturated carboxylic monomer are more preferred, and ABS resins and polystyrenes substituted with methacrylic acid are most preferred.

The method of producing the styrene resins is not particularly limited. A conventional method, such as mass polymerization, suspension polymerization, emulsion polymerization, or mass-suspension polymerization, may be employed.

The styrene resin used in the present invention is not particularly limited as long as the effect of the present invention is not diminished. From the standpoints of providing a polyamide resin composition that can achieve a good balance between various physical properties, compatibility with the polyamide, and the economy, a particularly preferable example of the ABS resin modified by unsaturated carboxylic acid is one prepared by mixing an unsaturated carboxylic acid-containing copolymer, which contains 40 to 80 percent by weight of an aromatic vinyl compound, 15 to 50 percent by weight of a vinyl cyanide compound, 0.1 to 20 percent by weight of an unsaturated carboxylic compound, and 0 to 30 percent by weight of another copolymerizable vinyl compound, with 70 to 5 percent by weight of a graft-copolymerizable vinyl compound in the presence of 30 to 95 percent by weight of a diene rubber having an average particle diameter of 0.01 to 5.0 µm.

When the content of the aromatic vinyl compound in the unsaturated carboxylic acid-containing copolymer used in making the unsaturated carboxylic acid-modified ABS resin exceeds 80 percent by weight, resistance to chemicals and impacts may decrease. At a content less than 40 percent by weight, the formability may decrease. When the content of the vinyl cyanide compound exceeds 50 percent by weight, the thermal stability during forming may decrease or coloring may occur by heating. At a content less than 15 percent by weight, resistance to chemicals and impact may decrease. When the content of the unsaturated carboxylic acid compound exceeds 20 percent by weight, the thermal stability during forming may decrease or coloring may occur by heating. At a content less than 0.1 percent by weight, the compatibility with the polyamide cannot be easily achieved, and exfoliation may occur at the surface of the resulting product. When the content of the other copolymerizable vinyl monomer exceeds 30 percent by weight, it may not be possible to achieve a satisfactory balance between the heat resistance and the impact resistance.

Examples of the aromatic vinyl compound used in the unsaturated carboxylic acid-containing copolymer include styrene, α-methylstyrene, chlorostyrene, and methylstyrene. From the standpoint of improving the heat resistance, use of α-methylene is particularly preferable. Examples of the vinyl cyanide compound include acrylonitrile and methacrylonitrile. Examples of the unsaturated carboxylic acid compound include acrylic acid and methacrylic acid. Examples of the other copolymerizable vinyl compound include alkyl esters of methacrylic acid and acrylic acid, such as methyl methacrylate, ethyl methacrylate, methyl acrylate, and ethyl acrylate; and maleimide compounds such as maleimide and phenylmaleimide. The above-described aromatic vinyl compound, vinyl cyanide compound, unsaturated carboxylic acid compound, and other copolymerizable vinyl compound may each be used alone or in combination.

For example, the unsaturated carboxylic acid-containing copolymer can be produced as follows: First, α-methylstyrene, water, and an emulsifier are charged in advance to prepare an appropriate emulsion. To the emulsion, acrylonitrile and other monomers are continuously added dropwise in minute amounts so that there is always large excess of α-methylstyrene, i.e., at least 80 percent by weight and preferably at least 90 percent by weight of α-methylstyrene, in the polymerization system, thereby yielding a target copolymer. Here, the unsaturated carboxylic compound may be charged in advance with α-methylstyrene or may be mixed with acrylonitrile and added. It is also possible to charge additional unsaturated carboxylic acid compound in portions after the unsaturated carboxylic acid compound is charged in advance. Moreover, addition of part of α-methylstyrene is also possible. In such a case, the amount of the α-methylstyrene charged in advance is preferably 50 to 90 percent by weight relative to 100 percent by weight of the entirety of the monomers from the standpoints of chemical resistance, impact resistance, and thermal deformation resistance.

A graft copolymer prepared by graft-copolymerizing 70 to 5 percent by weight of a graft-copolymerizable vinyl compound in the presence of 30 to 95 percent by weight of a diene rubber having an average particle diameter in the range of 0.01 to 5.0 μm is suitable for use.

Aromatic vinyl compounds, vinyl cyanide compounds, unsaturated carboxylic acid compounds, and other copolymerizable vinyl compounds may be used as the graft-copolymerizable vinyl compound. Examples of these are the same as those described above used in the unsaturated carboxylic acid-containing copolymer. These may be used alone or in combination.

At a diene rubber content exceeding 95 percent by weight, the impact resistance and the oil resistance may decrease. At a diene rubber content less than 30 percent by weight, the impact resistance may decrease. An example of the diene rubber is butadiene.

A diene rubber having an average particle diameter of 0.01 to 5.0 μm is preferably used in the graft copolymer from the standpoint of the impact resistance of the polyamide resin composition and the surface appearance of the resulting product. A diene rubber having an average particle diameter of 0.02 to 2.0 μm is particularly preferable. Furthermore, a diene rubber latex in which small-particle diene rubber latex is coagulated may be used to increase the impact strength. The small-particle diene rubber latex may be coagulated by a conventional method, for example, a method of adding an acidic substance (Japanese Examined Patent Application Publication Nos. 42-3112, 55-19246, and 2-9601 and Japanese Unexamined Patent Application Publication Nos. 63-117005, 63-132903, 7-157501, and 8-259777); or a method of adding an acid radical-containing latex (Japanese Unexamined Patent Application Publication Nos. 56-166201, 59-93701, 1-126301, 8-59704, and 9-217005), but the method is not particularly limited.

The unsaturated carboxylic acid-containing copolymer and the graft copolymer are preferably produced by emulsion polymerization, but the method is not limited to emulsion polymerization. For example, mass polymerization, suspension polymerization, solution polymerization, or any combination of these, i.e., emulsion-suspension polymerization or emulsion-mass polymerization may be employed. The emulsion polymerization may be conducted according to a conventional method. That is, the compounds described above may be reacted in an aqueous medium in the presence of a radical initiator. In such a case, the compounds may be used as a mixture or, if necessary, may be used separately. The compounds may be added in one step or may be consecutively added in portions, but the method of adding the compounds is not particularly limited. Examples of the radical initiator include water- or oil-soluble peroxides such as potassium persulfate, ammonium persulfate, cumen hydroperoxide, and paramethane hydroperoxide. These may be used alone or in combination. Appropriate polymerization accelerators, polymerization degree adjustors, and emulsifiers used in conventional emulsion polymerization may also be used.

A conventional method may be employed to obtain a dry resin from the resulting latex. In such a case, a dry resin may be obtained after mixing the unsaturated carboxylic acid-containing copolymer and the latex of the graft copolymer; alternatively, resins may be separately prepared and then mixed in the form of powder. As the method for obtaining a resin from a latex, a method in which an acid, such as hydrochloric acid, sulfuric acid, or acetic acid, or a metal salt, such as calcium chloride, magnesium chloride, or aluminum sulfate, is added to a latex to coagulate the latex, followed by dehydration and drying of the latex may be employed. The resulting mixed resin containing the unsaturated carboxylic acid-containing copolymer and the graft copolymer exhibits high compatibility with the polyamide resin while maintaining the inherent properties of the ABS resin.

The ratio (parts by weight) of the polyamide resin to the styrene resin used in the present invention is not particularly limited. From the standpoint of achieving a balance between different properties such as heat resistance and impact resistance, the ratio of the polyamide resin to the styrene resin is preferably 95:5 to 5:95, more preferably, 90:10 to 30:70, and most preferably 85:15 to 45:55.

In the polyamide resin composition of the present invention, the dispersion state of the swelling mica differs depending on the polarity of the polyamide resin and the styrene resin, the type of swelling mica, and the type of polyether compound. The number density of the swelling mica may be uniform among the respective resin phases, may be higher in the polyamide phase than in the styrene resin phase, or may be higher in the styrene resin phase than in the polyamide phase. In order to achieve a balance between heat resistance and mechanical properties, the density of the dispersed swelling mica is preferably higher in the polyamide resin phase of the polyamide resin composition.

The polyamide resin composition of the present invention may contain an anhydride-containing olefin copolymer in addition to the polyamide resin and the swelling mica treated with the polyether compound described above. According to this arrangement, for example, water absorption of the polyamide resin can be reduced.

The anhydride-containing olefin copolymer is obtained by copolymerization or graft polymerization of olefin or an olefin copolymer with an alicyclic dicarboxylic anhydride having a cis double bond in the ring or an α,β-unsaturated dicarboxylic anhydride.

Examples of the olefin or olefin copolymer include homopolymers of olefins such as polyethylene, polypropylene, and polybutene; copolymers of different olefins such as ethylene-propylene copolymers, ethylene-butene copolymers, propylene-butene copolymers, and ethylene-propylene-diene copolymers; and copolymers of olefins and different monomers.

Examples of the different monomers include α,β-unsaturated carboxylates, e.g., methacrylates such as methyl methacrylate, ethyl methacrylate, butyl methacrylate, 2-ethylhexyl methacrylate, and 2-hydroxyethyl methacrylate, and acrylates such as ethyl acrylate, butyl acrylate, 2-ethylhexyl acrylate, and 2-hydroxyethyl acrylate; styrenic compounds such as styrene, α-methylstyrene, and vinyltoluene; α,β-unsaturated nitriles such as acrylonitrile and methacrylonitrile; α,β-unsaturated carboxylic acids such as acrylic acid and methacrylic acid; vinyl acetate and vinyl ether; and mixtures of these. These may also be copolymerized if necessary.

The above-described copolymer may be a random copolymer, a block copolymer, a graft copolymer, or an alternating copolymer. Among these copolymers, an ethylene-propylene copolymer, an ethylene-butene copolymer, an ethylene-vinyl acetate copolymer., an ethylene-ethyl acrylate copolymer, an ethylene-methyl methacrylate copolymer, and an ethylene-propylene-diene copolymer are particularly preferable from the standpoints of yielding toughness, cost, and handling ease. The polyolefins described above may be used in combination of two or more.

Examples of the alicyclic dicarboxylic anhydride having a cis double bond in the ring include anhydrides of cis-4-cyclohexene-1,2-dicarboxylic acid, endo-bicyclo-(2,2,1)-5-heptene-2,3-dicarboxylic acid, methyl-endo-cis-bicyclo-(2,2,1)-5-heptene-2,3-dicarboxylic acid, and endo-bicyclo-(2,2,1)-1,2,3,4,7,7-hexachloro-2-heptene-5,6-dicarboxylic acid. From the standpoint of yielding toughness, endo-bicyclo-(2,2,1)-5-heptene-2,3-dicarboxylic anhydride is preferred. In some cases, their derivatives, e.g., dicarboxylic acids, dicarboxylic metal salts, esters, amides, and acid halides, may be used.

The α,β-unsaturated dicarboxylic anhydride is represented by general formula (4):

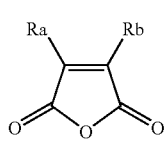

(4)

(wherein Ra and Rb each represent a hydrogen atom, an alkyl group, an alkenyl group, an alkynyl group, or a halogen atom; Ra and Rb may form a cyclic group with the adjacent carbon atoms; and the bond between the adjacent atoms of Ra and Rb may be a single bond instead of a double bond). Examples of such compound include maleic anhydride, methylmaleic anhydride, chloromaleic anhydride, butynylsuccinic anhydride, and tetrahydrophthalic anhydride.

In the anhydride-containing olefin copolymer used in the present invention, the lower limit of the ratio of the alicyclic dicarboxylic anhydride having a cis double bond in the ring or the α,β-unsaturated dicarboxylic anhydride for copolymerization or graft reaction is preferably 0.05 mol %, more preferably 0.1 mol %, and most preferably 0.2 mol % to 100 mol % of the olefin or olefin copolymer from the standpoint of yielding toughness. The upper limit of the ratio for the copolymerization or the graft reaction is preferably 80 mol %, more preferably 50 mol %, and most preferably 30 mol % from the stand point of the processability.

The anhydride-containing olefin copolymer may be produced by a typical conventional radical copolymerization. Alternatively, it may be produced by radical graft reaction of an olefin homopolymer or an olefin copolymer with at least one of the above-described different monomers in the presence of a radical generator and in the presence or absence of a solvent or a dispersion medium. In particular, when graft reaction is conducted in a molten state, the copolymer can be efficiently produced by using a melt mixer, such as an extruder or a kneader.

The lower limit of the amount of the anhydride-containing olefin copolymer added to the 100 parts by weight of the polyamide resin is preferably 1 part by weight, more preferably 2 parts by weight, and most preferably 3 parts by weight from the standpoint of suppressing water absorption. The upper limit is preferably 50 parts by weight, more preferably 30 parts by weight, yet more preferably 20 parts by weight, and most preferably 15 parts by weight from the standpoints of formability and stiffness.

The weight ratio of the anhydride-containing olefin copolymer in the polyamide resin composition is preferably in the range of 1 to 30 percent by weight.

The polyamide resin composition of the present invention may contain a carbon compound in addition to the polyamide resin and the swelling mica treated with the polyether compound described above. In this manner, antistatic properties can be yielded.

The carbon compound used in the present invention is not particularly limited and may be any commercially available product other than carbon fibers. From the standpoint of the surface quality, warpage, deformation, and the like of the resulting product, the carbon compound is preferably in the form of particles or fine fibrils. The carbon compound preferably has electric conductivity.

Examples of the carbon compound in the form of particles include acetylene black and various furnace carbon blacks having electric conductivity. Various commercially available products may be used. An example is Ketjenblack (registered trade mark) produced by KetjenBlack International. Examples of the carbon compound in the form of fine fibrils include fibrous carbon compounds having a diameter of approximately 3.5 to 75 nm, a.k.a., carbon nanotubes. Various commercially available carbon nanotubes may be used. An example is Hyperion (registered trade mark) produced by Hyperion Catalysis International. These may be used alone or in combination.

The lower limit of the amount of the carbon compound added to 100 parts by weight of the polyamide resin is preferably 0.5 parts by weight, more preferably 1.0 part by weight, and most preferably 1.5 parts by weight from the standpoint of conductivity. The upper limit of the carbon compound added is preferably 12 parts by weight, more preferably 11 parts by weight, and most preferably 10 parts by weight from the standpoint of pelletization of the resin composition by extrusion and mechanical strength.

The method for producing the polyamide resin composition of the present invention is not particularly limited. For example, the polyamide resin composition may be made by melt-mixing the polyamide resin and the swelling mica treated by the polyether compound using various types of conventional mixers. In the event of adding at least one selected from the styrene resin, the anhydride-containing olefin copolymer, and the carbon compound, the components may be melt-mixed in the same manner to produce the polyamide resin composition.

The temperature for the melt-mixing process is not particularly limited but is preferably 200° C. to 360° C. and more preferably 200° C. to 300° C.

Examples of the mixer include single-shaft extruders, twin-shaft extruders, rollers, banbury mixers, and kneaders. Mixers having high shear efficiency are particularly preferable. The polyamide resin, the swelling mica treated with the polyether compound, and the individual components added as required may be simultaneously placed in the above-described mixer. Alternatively, the polyamide resin may be melted in advance and then melt-mixed with the swelling mica.

If necessary, the polyamide resin composition of the present invention may contain polybutadiene, a butadiene-styrene copolymer, acryl rubber, ionomer, an ethylene-propylene copolymer, an ethylene-propylene-diene copolymer, natural rubber, chlorinated butyl rubber, an α-olefin homopolymer, a copolymer of two or more α-olefins (the copolymer may be a random copolymer, a block copolymer, a graft copolymer, or the like, or may be a mixture of these), and an impact resistance improver such as an olefin elastomer. These may be modified by an acid compound such as maleic anhydride or an epoxy compound such as glycidyl methacrylate.

As long as the mechanical properties and the like are not adversely affected, any other thermoplastic resin or thermosetting resin may be used. Examples thereof include unsaturated polyester resins, polyester carbonate resins, liquid crystalline polyester resins, polyolefin resins, thermoplastic polyester resins, rubber polymer-reinforced styrene resins, polyphenylene sulfide resins, polyphenylene ether resins, polyacetal resins, polysulfone resins, and polyarylate resins. These may be used alone or in combination.

Depending on the purpose, various additives, such as pigments and dyes, a heat stabilizer, an antioxidant, a UV absorber, a photostabilizer, a lubricant, a plasticizer, a flame retardant, and an antistatic agent, may be added.

The polyamide resin composition of the present invention is suitable for injection molding and heat-press molding and can be used in blow molding. The resulting product has excellent appearance, satisfactory mechanical properties, and high resistance to thermal deformation. Thus, for example, the composition is suitable for use in automobile parts, parts for home appliances, domestic houseware, wrapping materials, and other general industrial materials.

The polyamide resin composition containing the anhydride-containing olefin copolymer is particularly suitable for products prepared by injection molding. The resulting products have excellent heat stability, surface quality, and stiffness, and do not greatly change their properties by water absorption. Thus, the composition is suitable for use in automobile exterior components such as a front fender, a rear fender, a hood bulge, a side garnish, a rear garnish, a backdoor panel, and a wheel cap. When the composition is used in a front fender, a rear fender, a hood bulge, a side garnish, a rear garnish, and a backdoor panel among the automobile exterior components described above, the composition is preferably used in sections that affect the appearance. Moreover, when the composition is used in a wheel cap, the composition is preferably used in the entire wheel cap. However, the use of the composition is not limited to these.

The polyamide resin composition containing the carbon compound is particularly suitable for use in a product made by injection molding. The resulting product has electric conductivity and antistatic property and suffers little from anisotropy that leads to mold shrinkage. Thus, warpage is small even when a complex-shaped product is made by injection molding. Moreover, the stiffness and the heat resistance are excellent without lowering the surface quality of the polyamide resin. Thus, the composition is suitable for use in electrostatic recording sheets; housings for electronic devices; electrostatic containers; electrostatic films; floor coverings, wall materials, and partitions for clean rooms; covering materials for electronic devices; magazines for ICs and the like; head gimbal assembles; antistatic transfer trays for HDD internal components such as sliders and slider arms; HDD internal components such as containers for seeking arms; and antistatic transfer trays for other electronic components, for example.

BEST MODE FOR CARRYING OUT THE INVENTION

The present invention will now be described in detail with reference to the examples below; however, the present invention is not limited to these examples.

Below is a summary list of the primary materials used in EXAMPLES and COMPARATIVE EXAMPLES. Note that these materials were not purified unless otherwise noted.

(Materials)
Polyamide resin A1 (Nylon 6): Unitika Nylon 6 A1030BRL (product of Unitika Ltd.)
Polyamide resin A2 (Nylon 66): Unitika Nylon 66 A125N (product of Unitika Ltd.)
Polyamide resin A3 (Nylon 46): Stanyl TS300 (product of DSM-JSR)
Polyamide resin A4 (Nylon MXD6): Reny 6002 (product of Asahi Kasei Corporation)
Styrene resin B1 (ABS resin): resin prepared by the method described in REFERENCE EXAMPLE 1 below
Styrene resin B2 (styrene-methacrylic acid copolymer): G-9001 (product of Asahi Kasei Corporation)
Polyphenylene ether (PPE) resin: IUPIACE YPX-100L (product of Mitsubishi Engineering-Plastics Corporation)
Anhydride-containing olefin copolymer C1: Bondine AX8930 (product of Sumitomo Chemical Co., Ltd.) (polyolefin copolymer with maleic anhydride)
Anhydride-containing olefin copolymer C2: Tafmer MH7020 (product of Mitsui Chemicals) (polyolefin copolymer with maleic anhydride)
Anhydride-containing olefin copolymer C3: Tuftec M1943 (product of Asahi Kasei Corporation) (polyolefin copolymer with maleic anhydride)
Swelling mica E1: Somasif ME100 (product of Co-op Chemical Co., Ltd.)
Polyether compound F1: BISOL 18EN (product of Toho Chemical Industry Co., Ltd.)
Polyether compound F2: BISOL 20PN (product of Toho Chemical Industry Co., Ltd.)
Carbon compound G1: Ketjenblack (product of KetjenBlack International)
Carbon compound G2: master batch pellets containing PA6 and a fibril carbon material dispersed in PA6 at a concentration of 20%, product name MB4020-00 (product of Hyperion Catalysis International)
Carbon compound G3: master batch pellets containing PA66 and a fibrous carbon material dispersed in PA66 in a concentration of 20%, product name MB4620-00 (product of Hyperion Catalysis International)

The methods for determining various properties in EXAMPLES and COMPARATIVE EXAMPLES will now be described.

(Determining Dispersion State)
Dispersion state was determined using an ultrathin section 50 to 100 μm in thickness obtained by a frozen section technique. The section was observed with a transmission electron microscope (JEM-1200EX, product of JEOL) with an accelerating voltage of 80 kV at a magnification of 40,000 to 1,000,000 to obtain a microgram of the dispersion state of swelling mica. From this TEM micrograph, a region containing 100 or more of dispersed particles was arbitrarily selected. The layer thickness, the layer length, and the number of particles ([N] values) were determined either manually with a graduated ruler or by processing the microgram with Image Analyzer PIAS III produced by Inter Quest Co., Ltd.

The equivalent circular diameter [D] was determined with Image Analyzer PIAS III produced by Inter Quest Co., Ltd.

The [N] values were determined as follows. First, the number of particles of the swelling mica present in the selected region in the TEM micrograph was determined. The ash content of the resin composition derived from the swelling mica was separately determined. The number of the particles was divided by the ash content and the result was converted to a number per 100 $\mu m^2$ area. The number-average value of the layer thickness of the swelling mica was assumed as the average layer thickness; and the maximum value among the layer thickness of the swelling mica was assumed as the maximum layer thickness. A sample containing large dispersed particles and thus not suitable for observation by TEM was examined using an optical microscope (Optical microscope BH-2 produced by Olympus Optical Co., Ltd.), and the [N] values were determined as is described above. Where required, a sample was melted at 250° C. to 270° C. using Hotstage THM 600 produced by Linkam Scientific Instruments Ltd., and the state of the dispersed particle was observed in a molten state. The number-average value of the ratios of layer length to layer thickness of the individual swelling mica particles was assumed as the average aspect ratio. For dispersed particles that were not lamellar, the aspect ratio was determined as the ratio, major axis/minor axis. Here, a "major axis" is the long side of a hypothetic rectangle having the minimum area among hypothetic rectangles circumscribed with a target particle in a micrograph, and a "minor axis" is the short side of this hypothetic rectangle.

(Flexural Properties)

The polyamide resin composition of the present invention was dried (90° C., 10 hours). Using an injection molding machine operating at a clamping pressure of 75 t, a specimen having dimensions of approximately 10×100×6 mm was formed by injection molding at a resin temperature in the range of 240° C. to 300° C. (Nylon 6: 240° C., Nylon 66: 260° C., Nylon MXD6: 280° C., Nylon 46: 300° C.). The flexural strength and the flexural elastic modulus of the specimen were measured according to ASTM D-790.

(Deflection Temperature Under Load)

The deflection temperature under load was determined according to ASTM D-648 under a load of 1.86 MPa by using the same type of specimen used in determining the flexural properties.

(Warpage)

The polyamide resin composition of the present invention was dried (90° C., 10 hours). A tabular specimen having dimensions of approximately 120×120×1 mm was formed by injection molding at a resin temperature in the range of 240° C. to 300° C. (Nylon 6: 240° C., Nylon 66: 260° C., Nylon MXD6: 280° C., Nylon 46: 300° C.). The tabular specimen was placed on a flat surface, and one of the four corners was held down. Of the remaining three corners, one most distant from the flat surface was determined by measuring the distance with a slide caliper. The same was repeated for every corner, and the obtained warpages were averaged.

(Mold Shrinkage Rate)

The polyamide resin composition of the present invention was dried (90° C., 10 hours). A tabular specimen having dimensions of approximately 120×120×2 mm was formed by injection molding at a resin temperature in the range of 240° C. to 300° C. (Nylon 6: 200° C., Nylon 66: 260° C., Nylon MXD6: 280° C., Nylon 46: 300° C.). The mold shrinkage rate was determined by the following equation:

Mold shrinkage rate (%)=(size of die−observed size of molded product)/(size of die)×100

In the table below, MD denotes the direction of the resin flow, and TD denotes a direction orthogonal to the resin flow.

(Centerline Average Roughness)

The centerline average roughness was determined with surface analyzer Surfcom 1500A produced by Tokyo Seimitsu Co., Ltd., using the same type of specimen used in determining the mold shrinkage rate.

(Ash Content)

The ash content of the polyamide resin composition derived from the swelling mica was determined according to JIS K 7052.

(Method B Flow)

The polyamide resin composition of the present invention was dried (90° C., 10 hours). The method B flows after 5 minutes and after 15 minutes were determined using a flow tester produced by Shimadzu Corporation at a temperature of 280° C. under a load of 100 kg. The melt stability is higher when the difference between the flow after 5 minutes and the flow after 15 minutes is smaller.

(Sink Mark Evaluation)

The polyamide resin composition of the present invention was dried (90° C., 10 hours). Injection molding was performed at a resin temperature in the range of 240° C. to 280° C. (Nylon 6: 240° C., Nylon 66: 260° C., Nylon MXD6: 280° C.) to prepare a sample constituted from a circular plate having a diameter of approximately 100 mm and a thickness of approximately 2.5 mm and six ribs disposed on one face of the circular plate and arranged to radiate from the center of the circular plate, the six ribs respectively having dimensions of 0.8, 1.0, 1.2, 1.4, 1.6, and1.8×35×10 mm. The face of the sample not provided with the ribs was visually observed to determine the occurrence of any sink mark. Sink marks are recesses on the surface caused by thickness deviation and shrinkage of resin during molding and impair the surface appearance. The assessment was provided in terms of the thickness of the ribs that did not generate sink marks. The larger the thickness of the rib, the more likely that the sink marks will occur.

(Water Absorption)

The polyamide resin composition of the present invention was dried (90° C., 10 hours). Subsequently, an ASTM No. 1 dumbbell specimen was prepared at a resin temperature in the range of 240° C. to 280° C. (Nylon 6: 240° C., Nylon 66: 260° C., Nylon MXD6: 280° C.). The specimen was placed in distilled water at 23° C. for 24 hours, and the water absorption was measured according to the method set forth in JIS K7209.

(Warpage Upon Water Absorption)

The polyamide resin composition of the present invention was dried (90° C., 10 hours). Subsequently, a tabular specimen having dimensions of approximately 120×120×1 mm was prepared by injection molding at a resin temperature in the range of 240° C. to 260° C. (Nylon 6: 240° C., Nylon 66: 260° C.). After the specimen was placed in water at 23° C. for 24 hours, the warpage was measured. The specimen was placed on a flat surface, and one of the four corners of the specimen was held down. Of the remaining three corners, one most distant from the flat surface was determined by measuring the distance with a slide caliper. The same was repeated for every corner, and the obtained values were averaged.

(Surface Quality)

The surface roughness of the specimen was measured with a three dimensional, imaging surface structure analyzer (Zygo New View 5030 produced by Zygo Corporation).

(Melt Heat Stability)

The polyamide resin composition of the present invention was dried (90° C., 10 hours). Using a flow tester produced by Shimadzu Corporation, the Method B flows were measured after 5 minutes and after 15 minutes at 260° C. under a load of 100 kg. Simultaneously, color development was visually observed. The smaller the difference between the flows after 5 minutes and 15 minutes, the higher the melt heat stability.

(Volume Resistivity)

The volume resistivity was determined with resistance meter R8340A produced by Advantest Corporation using the same type of specimen used in determining mold shrinkage rate. The volume resistivity was measured after the specimen was allowed to stand at 25° C. and 50% RH for 24 hours.

SYNTHETIC EXAMPLE 1

Ion-exchange water, polyether compounds, and swelling mica at the weight ratios set forth in Table 1 were mixed for 15 to 30 minutes. The mixture was then dried and powdered to prepare swelling mica (Clays J-1 to J-6) treated with the polyether compounds.

TABLE 1

|  | Clay J-1 | Clay J-2 | Clay J-3 | Clay J-4 | Clay J-5 | Clay J-6 |
| --- | --- | --- | --- | --- | --- | --- |
| Water | 100 | 100 | 100 | 100 | 100 | 100 |
| Swelling mica E1 | 8 | 8 | 8 | 8 | 8 | 8 |
| Polyether compound F1 | 4 | 1.6 | 0.8 |  | 0.8 |  |
| Polyether compound F2 |  |  |  | 2.5 | 1.6 | 4 |

(unit: parts by weight)

SYNTHETIC EXAMPLE 2

Ion-exchange water, swelling mica, polyvinylpyrrolidone (PVP), methylstearylbis[PEG]ammonium chloride (Ethoquad produced by Lion Akzo Co., Ltd.), and trioctylmethylammonium chloride at the weight ratios set forth in Table 2 were mixed for 15 to 30 minutes. Subsequently, the mixture was dried and powdered (Clays K-1 to K-4).

TABLE 2

|  | Clay K-1 | Clay K-2 | Clay K-3 | Clay K-4 |
| --- | --- | --- | --- | --- |
| Water | 100 | 100 | 100 | 100 |
| Swelling mica E1 | 8 | 8 | 8 | 8 |
| Polyvinylpyrrolidone | 4 |  |  |  |
| Methylstearylbis[PEG] ammonium chloride |  | 8 |  |  |
| Trioctylmethylammonium chloride |  |  | 4 | 6 |

(unit: parts by weight)

EXAMPLES 1 AND 2 AND COMPARATIVE EXAMPLES 1 TO 4

Polyamide resin A1, the swelling mica prepared in SYNTHETIC EXAMPLE 1, the swelling mica prepared in SYNTHETIC EXAMPLE 2, and swelling mica E1 at the weight ratios set forth in Table 3 were melt-mixed using a twin shaft extruder (TEX 44 produced by Japan Steel Works, Ltd.) while adjusting the temperature to the dies to 220° C. to 250° C. from the initial stage of the mixing. The physical properties of the resulting polyamide resin compositions were evaluated. The results are shown in Table 3.

Table 3 shows that the swelling mica treated with PVP or ammonium salts did not exhibit sufficient reinforcing effect. Moreover, the warpage and the mold shrinkage were not significantly improved, and deterioration at the processing temperature was significant.

COMPARATIVE EXAMPLE 5

To a pressure reactor, 5,000 g of ε-caprolactam, 1,100 g of water, and 550 g of swelling mica were placed, and heated to 250° C. while stirring. The pressure inside the reactor was increased to 4 kg/cm² to 15 kg/cm² while releasing steam. The pressure was then reduced to about 2 kg/cm² and the temperature was increased to about 260° C. Under these conditions, polymerization for a polyamide composition containing approximately 10% of swelling mica was attempted. In the midst of the reaction, the motor load current of the mixer of the reactor became unstable, which eventually led to mixing failure due to overload. Thus, the polymerization was discontinued. In other words, an attempt was made to obtain a polyamide composition by polymerization but failed due to an increased melt viscosity.

TABLE 3

|  |  | EXAMPLES | | COMPARATIVE EXAMPLES | | | | |
| --- | --- | --- | --- | --- | --- | --- | --- | --- |
|  |  | 1 | 2 | 1 | 2 | 3 | 4 | 5 |
| Polyamide resin A1 | Parts by weight |  |  |  | 100 |  |  |  |
| Clay J-2 |  | 13 |  |  |  |  |  |  |
| Clay J-4 |  |  | 15 |  |  |  |  |  |
| Clay K-1 |  |  |  |  | 18 |  |  |  |
| Clay K-2 |  |  |  |  |  | 25 |  |  |

TABLE 3-continued

|  |  | EXAMPLES | | COMPARATIVE EXAMPLES | | | | |
|---|---|---|---|---|---|---|---|---|
|  |  | 1 | 2 | 1 | 2 | 3 | 4 | 5 |
| Clay K-3 |  |  |  |  |  |  | 18 |  |
| Swelling mica E1 |  |  |  | 11 |  |  |  | 11 |
| Ash content | wt % | 9.6 | 9.9 | 10.0 | 10.2 | 10.0 | 10.2 | 10.1 |
| Ratio of [D] ≦300 nm | % | 90 | 81 | 0 | 5 | 15 | 2 | *** |
| Average [D] | nm | 104 | 117 | 2420 | 1230 | 550 | 1340 | *** |
| Number of dispersed particles [N] | no./wt % · 100 μm² | 135 | 113 | 3 | 10 | 25 | 8 | *** |
| Average aspect ratio | — | 140 | 108 | 1.5 (*1) | 7 | 8 | 3 (*1) | *** |
| Average layer thickness | nm | 8.5 | 9.5 | App. 2,000 (*2) | 89 | 58 | App. 300 (*2) | *** |
| Maximum layer thickness | nm | 33 | 39 | App. 70,000 (*3) | 450 | 225 | App. 1,000 (*3) | *** |
| Flexural elastic modulus | MPa | 5450 | 5100 | 3010 | * | 3430 | 3200 | *** |
| Flexural strength | MPa | 130 | 130 | 95 | * | 42 | 80 | *** |
| Deflection temperature under load | ° C. | 145 | 139 | 70 | * | 82 | 79 | *** |
| Warpage | mm | 1.3 | 1.6 | 7.8 | * | 5.9 | 7.8 | *** |
| Mold shrinkage rate MD | % | 0.44 | 0.47 | 1.43 | * | 1.34 | 1.42 | *** |
| TD |  | 0.49 | 0.53 | 1.59 | * | 1.45 | 1.59 | *** |
| Centerline average roughness | nm | 4.0 | 4.0 | 210 | * | 98.0 | 200 | *** |
| Method B flow  After 5 min | ×10⁻² ml/sec | 31 | 32 | 36 | ** | 112 | 78 | *** |
| After 15 min |  | 30 | 31 | 35 | ** | ** | ** | *** |
| Note |  | Melt mixing | Melt mixing | Melt mixing | Melt mixing | Melt mixing | Melt mixing | Polymerization |

The descriptions of the reference symbols in the tables above are as follows:
*: Significant deterioration occurred during the melt processing; thus, no specimen usable in measurement was obtained.
**: Measurement was not possible due to severe deterioration.
***: The mixer motor of the reactor was overloaded due to an increase in the melt viscosity, and the polymerization was thus discontinued.
(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

COMPARATIVE EXAMPLES 6 TO 8

Polyamide resin A1, talc, mica, and a glass fiber reinforcing material at the weight ratios set forth in Table 4 were melt-mixed as in EXAMPLE 1 to prepare polyamide resin compositions. The properties thereof were evaluated. The results are shown in Table 4.

TABLE 4

|  |  | COMPARATIVE EXAMPLES | | |
|---|---|---|---|---|
|  |  | 6 | 7 | 8 |
| Polyamide resin A1 | Parts by weight |  | 100 |  |
| Talc |  | 11 |  |  |
| Mica |  |  | 11 |  |
| Glass fibers |  |  |  | 11 |
| Ash content | wt % | 10.0 | 9.9 | 9.9 |
| Ratio of [D] ≦300 nm | % | 0 | 0 | Not measured |
| Average [D] | nm | 2420 | 2580 | Not measured |
| Number of dispersed particles [N] | no./wt % · 100 μm² | 5 | 2 | Not measured |
| Average aspect ratio | — | 1.5 (*1) | 1.5 (*1) | Not measured |
| Average layer thickness | nm | App. 3,000 (*2) | App. 3,000 (*2) | Not measured |
| Maximum layer thickness | nm | App. 90,000 (*3) | App. 90,000 (*3) | Not measured |
| Flexural elastic modulus | MPa | 3010 | 4250 | 5400 |
| Flexural strength | MPa | 95 | 120 | 130 |
| Deflection temperature under load | ° C. | 72 | 90 | 148 |
| Warpage | mm | 7.8 | 7.1 | 14.2 |
| Mold shrinkage rate MD | % | 1.43 | 1.40 | 0.56 |
| TD |  | 1.59 | 1.55 | 1.78 |
| Centerline average roughness | nm | 210 | 430 | 690 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

Table 4 shows that neither talc nor mica conventionally used exhibited a sufficient reinforcing effect. Moreover, the warpage and the mold shrinkage were not significantly improved, and the surface quality was degraded. Although the reinforcing effect could be achieved by adding the glass fibers, this adversely affected the warpage and the surface quality. Thus, none of COMPARATIVE EXAMPLES 6 to 8 achieved a satisfactory balance.

EXAMPLES 3 TO 6

Polyamide resin A1 and the swelling mica obtained in SYNTHETIC EXAMPLE 1 at the weight ratios set forth in Table 5 were melt-mixed using a twin shaft extruder (TEX 44 produced by Japan Steel Works, Ltd.) as in EXAMPLE 1 to obtain polyamide resin compositions. The properties of the compositions were evaluated, and the results are shown in Table 5.

TABLE 5

|  |  | EXAMPLES | | | |
|---|---|---|---|---|---|
|  |  | 3 | 4 | 5 | 6 |
| Polyamide resin A1 | Parts by weight | 100 | | | |
| Clay J-2 | weight | 5 | 7.8 | 20 | 30 |
| Ash content | wt % | 4.0 | 6.0 | 13.9 | 19.2 |
| Ratio of [D] ≦300 nm | % | 90 | 90 | 80 | 65 |
| Average [D] | nm | 103 | 104 | 140 | 168 |
| Number of dispersed particles [N] | no./wt % · 100 μm$^2$ | 135 | 135 | 112 | 85 |
| Average aspect ratio | — | 138 | 140 | 102 | 82 |
| Average layer thickness | nm | 8.3 | 8.5 | 11 | 13 |
| Maximum layer thickness | nm | 34 | 33 | 48 | 65 |
| Flexural elastic modulus | MPa | 4010 | 4850 | 6650 | 8030 |
| Flexural strength | MPa | 118 | 123 | 130 | 132 |
| Deflection temperature under load | ° C. | 108 | 131 | 160 | 182 |
| Warpage | mm | 2.5 | 1.9 | 1.0 | 0.6 |
| Mold shrinkage rate MD | % | 0.67 | 0.54 | 0.29 | 0.19 |
| TD |  | 0.68 | 0.59 | 0.32 | 0.20 |
| Centerline average roughness | nm | 3.8 | 3.8 | 4.3 | 5.7 |

EXAMPLES 7 TO 11

Polyamide resin A2 and the swelling mica obtained in SYNTHETIC EXAMPLE 1 at the weight ratios set forth in Table 6 were melt-mixed using a twin shaft extruder (TEX 44 produced by Japan Steel Works, Ltd.) while adjusting the temperature to the dies to 230° C. to 260° C. from the initial stage of the mixing. The physical properties of the resulting polyamide resin compositions were evaluated. The results are shown in Table 6.

TABLE 6

|  |  | EXAMPLES | | | | |
|---|---|---|---|---|---|---|
|  |  | 7 | 8 | 9 | 10 | 11 |
| Polyamide resin A2 | Parts by weight | 100 | | | | |
| Clay J-1 |  | 16 | | | | |
| Clay J-2 |  |  | 13 | 28 | | |
| Clay J-3 |  |  |  |  | 11 | |
| Clay J-4 |  |  |  |  |  | 14 |
| Ash content | wt % | 9.3 | 9.5 | 18.1 | 9.1 | 9.4 |
| Ratio of [D] ≦300 nm | % | 92 | 80 | 70 | 69 | 35 |
| Average [D] | nm | 108 | 145 | 165 | 201 | 417 |
| Number of dispersed particles [N] | no./wt % · 100 μm$^2$ | 140 | 100 | 92 | 80 | 46 |
| Average aspect ratio | — | 143 | 105 | 95 | 88 | 51 |
| Average layer thickness | nm | 7.8 | 10.5 | 12.5 | 14.5 | 34.5 |
| Maximum layer thickness | nm | 30 | 50 | 58 | 65 | 152 |
| Flexural elastic modulus | MPa | 5900 | 5600 | 7990 | 5550 | 4850 |
| Flexural strength | MPa | 125 | 115 | 131 | 115 | 91 |
| Deflection temperature under load | ° C. | 148 | 140 | 178 | 138 | 123 |
| Warpage | mm | 1.0 | 1.0 | 0.5 | 1.2 | 3.7 |
| Mold shrinkage rate MD | % | 0.25 | 0.30 | 0.16 | 0.36 | 0.67 |
| TD |  | 0.27 | 0.33 | 0.17 | 0.40 | 0.70 |
| Centerline average roughness | nm | 3.7 | 4.1 | 5.2 | 4.0 | 7.0 |

COMPARATIVE EXAMPLE 9 TO 11

Polyamide resin A2, talc, mica, and a glass fiber reinforcing material at the weight ratios set forth in Table 7 were melt-mixed as in EXAMPLE 7 to prepare polyamide resin compositions. The physical properties thereof were evaluated, and the results are shown in Table 7.

TABLE 7

|  |  | COMPARATIVE EXAMPLES | | |
|---|---|---|---|---|
|  |  | 9 | 10 | 11 |
| Polyamide resin A2 | Parts by weight | 100 | | |
| Talc |  | 11 | | |
| Mica |  |  | 11 | |
| Glass fibers |  |  |  | 11 |
| Ash content | wt % | 10.0 | 10.0 | 10.0 |
| Ratio of [D] ≦300 nm | % | 0 | 0 | Not measured |
| Average [D] | nm | 2420 | 2580 | Not measured |
| Number of dispersed particles [N] | no./wt % · 100 μm$^2$ | 5 | 2 | Not measured |
| Average aspect ratio | — | 1.5 (*1) | 1.5 (*1) | Not measured |
| Average layer thickness | nm | App. 3,000 (*2) | App. 3,000 (*2) | Not measured |
| Maximum layer thickness | nm | App. 90,000 (*3) | App. 90,000 (*3) | Not measured |
| Flexural elastic modulus | MPa | 3200 | 4500 | 5500 |
| Flexural strength | MPa | 108 | 123 | 135 |
| Deflection temperature under load | ° C. | 86 | 97 | 148 |
| Warpage | mm | 7.2 | 6.5 | 13.5 |

TABLE 7-continued

|  |  |  | COMPARATIVE EXAMPLES | | |
|---|---|---|---|---|---|
|  |  |  | 9 | 10 | 11 |
| Mold shrinkage rate | MD | % | 1.38 | 1.30 | 0.44 |
|  | TD |  | 1.49 | 1.41 | 1.56 |
| Centerline average roughness |  | nm | 200 | 430 | 700 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

Table 7 shows that neither talc nor mica conventionally used exhibited a sufficient reinforcing effect. Moreover, the warpage and the mold shrinkage were not significantly improved, and the surface quality was degraded. Although the reinforcing effect could be achieved by adding the glass fibers, this adversely affected the warpage and the surface quality. Thus, none of COMPARATIVE EXAMPLES 9 to 11 achieved a satisfactory balance.

EXAMPLE 12 AND COMPARATIVE EXAMPLE 12

Polyamide resin A3 and the swelling mica prepared in SYNTHETIC EXAMPLE 1 or talc at the weight ratios set forth in Table 8 were melt-mixed using a twin shaft extruder (TEX 44 produced by Japan Steel Works, Ltd.) while adjusting the temperature to the die to 280° C. to 300° C. from the initial stage of mixing. The physical properties of the resulting polyamide resin compositions were evaluated, and the results are shown in Table 8.

TABLE 8

|  |  |  | EXAMPLE 12 | COMPARATIVE EXAMPLE 12 |
|---|---|---|---|---|
| Polyamide resin A3 | Parts by |  | 100 |  |
| Clay J-2 | weight |  | 13 |  |
| Talc |  |  |  | 11 |
| Ash content | wt % |  | 9.6 | 10.0 |
| Ratio of [D] ≦300 nm | % |  | 89 | 0 |
| Average [D] | nm |  | 102.5 | 2420 |
| Number of dispersed particles [N] | no./wt % · 100 μm² |  | 134 | 5 |
| Average aspect ratio | — |  | 140 | 1.5 (*1) |
| Average layer thickness | nm |  | 8.5 | App. 3,000 (*2) |
| Maximum layer thickness | nm |  | 34 | App. 90,000 (*3) |
| Flexural elastic modulus | MPa |  | 5080 | 5150 |
| Flexural strength | MPa |  | 145 | 135 |
| Deflection temperature under load | ° C. |  | 186 | 135 |
| Warpage | mm |  | 0.8 | 1.9 |
| Mold shrinkage rate | MD | % | 0.35 | 0.54 |
|  | TD |  | 0.45 | 0.59 |
| Centerline average roughness |  | nm | 3.8 | 210 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

Table 8 shows that the talc conventionally used did not exhibit a sufficient reinforcing effect. Moreover, the warpage and the mold shrinkage were not significantly improved, and the surface quality was degraded.

EXAMPLE 13 AND COMPARATIVE EXAMPLE 13

Polyamide resin A4 and the swelling mica prepared in SYNTHETIC EXAMPLE 1 or talc at the weight ratios set forth in Table 9 were melt-mixed using a twin shaft extruder (TEX 44 produced by Japan Steel Works, Ltd.) while adjusting the temperature to the dies to 250° C. to 290° C. from the initial stage of the mixing. The physical properties of the resulting polyamide resin compositions were evaluated, and the results are shown in Table 9.

TABLE 9

|  |  |  | EXAMPLE 13 | COMPARATIVE EXAMPLE 13 |
|---|---|---|---|---|
| Polyamide resin A4 | Parts by |  | 100 |  |
| Clay J-2 | weight |  | 13 |  |
| Talc |  |  |  | 11 |
| Ash content | wt % |  | 9.5 | 10.0 |
| Ratio of [D] ≦300 nm | % |  | 102 | 0 |
| Average [D] | nm |  | 132 | 2420 |
| Number of dispersed particles [N] | no./wt % · 100 μm² |  | 120 | 5 |
| Average aspect ratio | — |  | 125 | 1.5 (*1) |
| Average layer thickness | nm |  | 10 | App. 3,000 (*2) |
| Maximum layer thickness | nm |  | 41 | App. 90,000 (*3) |
| Flexural elastic modulus | MPa |  | 7000 | 4910 |
| Flexural strength | MPa |  | 167 | 135 |
| Deflection temperature under load | ° C. |  | 116 | 88 |
| Warpage | mm |  | 1.0 | 1.9 |
| Mold shrinkage rate | MD | % | 0.45 | 1.46 |
|  | TD |  | 0.54 | 1.53 |
| Centerline average roughness |  | nm | 4.1 | 220 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

Table 9 shows that the talc conventionally used did not exhibit a sufficient reinforcing effect. Moreover, the warpage and the mold shrinkage were not significantly improved, and the surface quality was degraded.

REFERENCE EXAMPLE 1

In a reactor can equipped with a stirrer and a reflux condenser, the following substances were charged in a nitrogen gas stream: water (250 parts), sodium formaldehyde sulfoxylate (0.4 part), ferrous sulfate (0.0025 part), disodium ethylenediaminetetraacetate (Q.01 part), and sodium dioctylsulfosuccinate (2.0 part). After the mixture was heated to 60° C. under stirring, a monomer mixture having a composition set forth in Table 10, cumene hydroperoxide (initiator), and tert-dodecyl mercaptan (polymerization degree adjustor) were continuously added dropwise over 6 hours. The stirring was continued at 60° C. for 1 hour after the completion of the dropping. The polymerization was terminated to obtain unsaturated carboxylic acid-containing copolymer (a).

TABLE 10

|  |  | Unsaturated carboxylic acid-containing copolymer (a) |
|---|---|---|
| Vinyl monomer (wt %) | α-Methylstyrene | 75 |
|  | Acrylonitrile | 20 |
|  | Methacrylic acid | 5 |
| Cumene hydroperoxide (parts by weight) |  | 0.3 |
| tert-Dodecyl mercaptan (parts by weight) |  | 0.5 |

Next, in a reactor can equipped with a stirrer and a reflux condenser, the following substances were charged in a nitrogen gas stream: water (250 parts), potassium persulfate (0.5 part), butadiene (100 parts), tert-dodecyl mercaptan (0.3 part), and disproportionated sodium rosinate (3.0 parts). The polymerization was conducted at 60° C. and terminated when the polymerization rate of butadiene reached 80%. Unreacted butadiene was removed to obtain a rubber polymer, i.e., polybutadiene latex (X). The average particle diameter of the polybutadiene rubber was 0.30 μm.

In a reactor can equipped with a stirrer and a reflux condenser, the following substances were charged in a nitrogen gas stream: water (250 parts), sodium formaldehyde sulfoxylate (0.4 part), ferrous sulfate (0.0025 part), disodium ethylenediaminetetraacetate (0.01 part), and polybutadiene (polybutadiene (X) prepared as in the above) in an amount set forth in Table 11. After the mixture was heated to 60° C. under stirring, a monomer mixture having a composition set forth in Table 11, cumene hydroperoxide (initiator), and tert-dodecyl mercaptan (polymerization degree adjustor) were continuously added dropwise over 5 hours. The stirring was continued at 60° C. for 1 hour after the completion of the dropping. The polymerization was terminated to obtain graft copolymer (b).

TABLE 11

|  |  | Graft copolymer (b) |
|---|---|---|
| Polybutadiene (X) | (wt %) | 70 |
| Vinyl monomer (wt %) | Styrene | 10 |
|  | Methyl methacrylate | 20 |
| Cumene hydroperoxide (parts by weight) |  | 0.3 |
| tert-Dodecyl mercaptan (parts by weight) |  | 0.2 |

The latexes of the unsaturated carboxylic acid-containing copolymer (a) and the graft copolymer (b) obtained as above were homogeneously mixed at a ratio shown in Table 12. A phenolic antioxidant was added to the mixture, and the resulting mixture was coagulated with an aqueous magnesium chloride solution, followed by water washing, dehydration, and drying. An ABS resin was thus obtained.

TABLE 12

|  | Styrene resin B1 |
|---|---|
| Unsaturated carboxylic acid-containing copolymer (a) (parts by weight) | 64 |
| Graft copolymer (b) (parts by weight) | 36 |

EXAMPLES 14 TO 18 AND COMPARATIVE EXAMPLES 14 TO 17

Polyamide resin A1, styrene resins B1 and B2, a polyphenylene ether resin, the swelling mica prepared in SYNTHETIC EXAMPLE 1, and the swelling mica prepared in SYNTHETIC EXAMPLE 2 at the weight ratios set forth in Table 13 were melt-mixed using a twin shaft extruder (TEX 44 produced by Japan Steel Works, Ltd.) while adjusting the temperature to the dies to 220° C. to 250° C. from the initial stage of the mixing. The physical properties of the resulting polyamide resin compositions were evaluated. The results are shown in Table 13.

Table 13 shows that a sufficient reinforcing effect was not achieved with the swelling mica treated with PVP or an ammonium salt. Moreover, the warpage was not substantially improved, and deterioration at the processing temperature was severe. With the untreated swelling mica, a sufficient reinforcing effect was not achieved, the warpage was not substantially improved, and the surface quality was significantly low. The compositions containing a styrene resin exhibited improved sink mark formation and water absorption compared to those without a styrene resin. The compositions containing a polyphenylene ether resin instead of a styrene resin could not achieve high surface quality. The compositions without a polyphenylene ether resin exhibited higher surface quality.

TABLE 13

|  |  | EXAMPLES |  |  |  |  | COMPARATIVE EXAMPLES |  |  |  |
|---|---|---|---|---|---|---|---|---|---|---|
|  |  | 14 | 15 | 16 | 17 | 18 | 14 | 15 | 16 | 17 |
| Polyamide resin A1 | Parts by weight | 55 | 55 | 55 | 100 | 55 | 55 | 55 | 55 | 55 |
| Styrene resin B1 |  | 45 | 45 |  |  |  | 45 | 45 | 45 | 45 |
| Styrene resin B2 |  |  |  | 45 |  |  |  |  |  |  |
| Polyphenylene ether |  |  |  |  |  | 45 |  |  |  |  |
| Clay J-2 |  | 8 |  | 8 | 8 | 8 |  |  |  |  |
| Clay J-4 |  |  | 9 |  |  |  |  |  |  |  |
| Clay K-1 |  |  |  |  |  |  |  | 10 |  |  |
| Clay K-2 |  |  |  |  |  |  |  |  | 14 |  |
| Clay K-3 |  |  |  |  |  |  |  |  |  | 10 |
| Swelling mica E1 |  |  |  |  |  |  | 6.5 |  |  |  |
| Ash content | wt % | 6.2 | 6.3 | 6.2 | 6.2 | 6.2 | 6.1 | 6.1 | 6.1 | 6.1 |
| Ratio of [D] ≦300 nm | % | 90 | 83 | 87 | 93 | 90 | 0 | 6 | 15 | 3 |
| Average [D] | nm | 101 | 124 | 109 | 98 | 103 | 2490 | 1060 | 520 | 1430 |
| Number of dispersed | no./wt % · | 137 | 110 | 131 | 141 | 142 | 3 | 9 | 26 | 8 |

TABLE 13-continued

|  |  | EXAMPLES | | | | | COMPARATIVE EXAMPLES | | | |
|---|---|---|---|---|---|---|---|---|---|---|
|  |  | 14 | 15 | 16 | 17 | 18 | 14 | 15 | 16 | 17 |
| particles [N] | 100 μm² |  |  |  |  |  |  |  |  |  |
| Average aspect ratio | — | 127 | 111 | 130 | 142 | 129 | 1.5 (*1) | 7 | 8 | 4 (*1) |
| Average layer thickness | nm | 8.3 | 9.8 | 8.5 | 8 | 8.2 | App. 2000 (*2) | 86 | 56 | App. 300 (*2) |
| Maximum layer thickness | nm | 40 | 41 | 36 | 33 | 39 | App. 70000 (*3) | 480 | 240 | App. 1000 (*3) |
| Flexural elastic modulus | MPa | 3800 | 3600 | 3900 | 4300 | 4000 | 2800 | * | 2650 | 2800 |
| Flexural strength | MPa | 110 | 106 | 111 | 118 | 115 | 87 | * | 45 | 75 |
| Deflection temperature under load | ° C. | 163 | 158 | 159 | 192 | 168 | 132 | * | 125 | 136 |
| Warpage | mm | 0.8 | 1.1 | 0.7 | 1.6 | 0.8 | 4.2 | * | 3.7 | 3.9 |
| Centerline average roughness | nm | 3.0 | 4.0 | 3.0 | 4 | 260 | 190 | * | 92 | 220 |
| Method B flow  After 5 min | ×10⁻² ml/sec | 16 | 18 | 29 | 30 | 10 | 15 | ** | 82 | 62 |
| After 15 min |  | 16 | 18 | 28 | 29 | 10 | 15 | ** | ** | ** |
| Sink mark formation | mm | 1.6 | 1.6 | 1.6 | 0.8 | 1.6 | 1.4 | * | 1.6 | 1.6 |
| Water absorption | % | 0.8 | 0.8 | 0.8 | 1.9 | 0.8 | 0.8 | * | 1.0 | 0.8 |
| Note |  | Melt mixing | Melt mixing | Melt mixing | Melt mixing | Melt mixing | Melt mixing | Melt mixing | Melt mixing | Melt mixing |

*: Significant deterioration occurred during the melt processing; thus, no specimen usable in measurement was obtained.
**: Measurement was not possible due to severe deterioration.
(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

COMPARATIVE EXAMPLES 19 TO 21

Polyamide resin A1, styrene resin B1, talc, mica, and a glass fiber reinforcing material at the weight ratios set forth in Table 14 were melt-mixed as in EXAMPLE 14 to prepare polyamide resin compositions. The properties thereof were evaluated. The results are shown in Table 14.

TABLE 14

|  |  | COMPARATIVE EXAMPLES | | |
|---|---|---|---|---|
|  |  | 19 | 20 | 21 |
| Polyamide resin A1 | Parts by weight | 55 | 55 | 55 |
| Styrene resin B1 |  | 45 | 45 | 45 |
| Talc |  | 6.5 |  |  |
| Mica |  |  | 6.5 |  |
| Glass fibers |  |  |  | 6.5 |
| Ash content | wt % | 6.1 | 6.1 | 6.1 |
| Ratio of [D] ≦300 nm | % | 0 | 0 | Not measured |
| Average [D] | nm | 2420 | 5200 | Not measured |
| Number of dispersed particles [N] | no./wt % · 100 μm² | 5 | 1 | Not measured |
| Average aspect ratio | — | 1.5 (*1) | 2.0 (*1) | Not measured |
| Average layer thickness | nm | App. 3,000 (*2) | App. 5,000 (*2) | Not measured |
| Maximum layer thickness | nm | App. 90,000 (*3) | App. 120,000 (*3) | Not measured |
| Flexural elastic modulus | MPa | 2650 | 2800 | 3800 |
| Flexural strength | MPa | 95 | 102 | 115 |
| Deflection temperature under load | ° C. | 132 | 128 | 155 |
| Warpage | mm | 3.8 | 4.3 | 7.5 |
| Centerline average roughness | nm | 230 | 410 | 650 |
| Sink mark formation | mm | 2 | 2 | 2 |
| Water absorption | % | 0.8 | 0.9 | 0.8 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

Table 14 shows that neither talc nor mica conventionally used exhibited a sufficient reinforcing effect or substantially improved heat resistance or warpage, thus resulting in low surface quality. Although the reinforcing effect and the heat resistance could be achieved by adding the glass fibers, this adversely affected the warpage and surface quality. Thus, none of COMPARATIVE EXAMPLES 19 to 21 achieved a satisfactory balance.

EXAMPLES 19 TO 22

Polyamide resin A1, styrene resin B1, and the swelling mica obtained in SYNTHETIC EXAMPLE 1 at the weight ratios set forth in Table 15 were melt-mixed using a twin shaft extruder (TEX 44 produced by Japan Steel Works, Ltd.) while adjusting the temperature to the dies to 220° C. to 250° C. from the initial stage of the mixing. The physical properties of the resulting polyamide resin compositions were evaluated. The results are shown in Table 15.

TABLE 15

|  |  | EXAMPLES | | | |
|---|---|---|---|---|---|
|  |  | 19 | 20 | 21 | 22 |
| Polyamide resin A1 | Parts by weight | 55 | 55 | 55 | 70 |
| Styrene resin B1 |  | 45 | 45 | 45 | 30 |

TABLE 15-continued

|  |  | EXAMPLES | | | |
| --- | --- | --- | --- | --- | --- |
|  |  | 19 | 20 | 21 | 22 |
| Clay J-2 |  | 5 | 12 | 17 | 12 |
| Ash content | wt % | 4.0 | 8.9 | 12.1 | 8.9 |
| Ratio of [D] ≦300 nm | % | 92 | 85 | 77 | 89 |
| Average [D] | nm | 100 | 121 | 142 | 101 |
| Number of dispersed particles [N] | no./wt % · 100 μm$^2$ | 140 | 129 | 114 | 138 |
| Average aspect ratio | — | 138 | 140 | 112 | 142 |
| Average layer thickness | nm | 8.3 | 8.8 | 11.2 | 8.1 |
| Maximum layer thickness | nm | 34 | 33 | 48 | 33 |
| Flexural elastic modulus | MPa | 3200 | 4200 | 4800 | 4600 |
| Flexural strength | MPa | 102 | 119 | 123 | 120 |
| Deflection temperature under load | ° C. | 155 | 165 | 171 | 175 |
| Warpage | mm | 0.9 | 0.5 | 0.5 | 1.0 |
| Centerline average roughness | nm | 2.5 | 3.2 | 4.3 | 2.0 |
| Sink mark formation | mm | 1.6 | 1.6 | 1.8 | 1.6 |
| Water absorption | % | 0.8 | 0.8 | 0.7 | 1.2 |

EXAMPLES 23 TO 26

Polyamide resin A2, styrene resin B1, and the swelling mica obtained in SYNTHETIC EXAMPLE 1 at the weight ratios set forth in Table 16 were melt-mixed using a twin shaft extruder (TEX 44 produced by Japan Steel Works, Ltd.) while adjusting the temperature to the dies to 230° C. to 260° C. from the initial stage of the mixing. The physical properties of the resulting polyamide resin compositions were evaluated. The results are shown in Table 16.

TABLE 16

|  |  | EXAMPLES | | | |
| --- | --- | --- | --- | --- | --- |
|  |  | 23 | 24 | 25 | 26 |
| Polyamide resin A2 | Parts by weight | 60 | 60 | 60 | 60 |
| Polystyrene resin B1 |  | 40 | 40 | 40 | 40 |
| Clay J-1 |  | 10 |  |  |  |
| Clay J-2 |  |  | 8 |  |  |
| Clay J-3 |  |  |  | 7 |  |
| Clay J-4 |  |  |  |  | 9 |
| Ash content | wt % | 6.1 | 6.2 | 5.9 | 6.3 |
| Ratio of [D] ≦300 nm | % | 90 | 81 | 72 | 40 |
| Average [D] | nm | 110 | 143 | 193 | 388 |
| Number of dispersed particles [N] | no./wt % · 100 μm$^2$ | 141 | 100 | 80 | 49 |
| Average aspect ratio | — | 140 | 109 | 101 | 53 |
| Average layer thickness | nm | 8.2 | 10.5 | 13.9 | 31 |
| Maximum layer thickness | nm | 31 | 45 | 61 | 139 |
| Flexural elastic modulus | MPa | 4000 | 4000 | 3900 | 3800 |
| Flexural strength | MPa | 113 | 112 | 110 | 103 |
| Deflection temperature under load | ° C. | 188 | 183 | 179 | 172 |

TABLE 16-continued

|  |  | EXAMPLES | | | |
| --- | --- | --- | --- | --- | --- |
|  |  | 23 | 24 | 25 | 26 |
| Warpage | mm | 0.7 | 0.9 | 1.0 | 1.5 |
| Centerline average roughness | nm | 3.5 | 4.0 | 4.0 | 6.0 |
| Sink mark formation | mm | 1.8 | 1.8 | 1.8 | 1.6 |
| Water absorption | % | 0.5 | 0.5 | 0.5 | 0.5 |

COMPARATIVE EXAMPLES 22 TO 24

Polyamide resin A2, styrene resin B1, talc, mica, and a glass fiber reinforcing material at the weight ratios set forth in Table 17 were melt-mixed as in EXAMPLE 23. The physical properties of the resulting polyamide resin compositions were evaluated. The results are shown in Table 17.

TABLE 17

|  |  | COMPARATIVE EXAMPLES | | |
| --- | --- | --- | --- | --- |
|  |  | 22 | 23 | 24 |
| Polyamide resin A2 | Parts by weight | 60 | 60 | 60 |
| Styrene resin B1 |  | 40 | 40 | 40 |
| Talc |  | 6.5 |  |  |
| Mica |  |  | 6.5 |  |
| Glass fibers |  |  |  | 6.5 |
| Ash content | wt % | 6.1 | 6.1 | 6.1 |
| Ratio of [D] ≦300 nm | % | 0 | 0 | Not measured |
| Average [D] | nm | 2450 | 5300 | Not measured |
| Number of dispersed particles [N] | no./wt % · 100 μm$^2$ | 5 | 2 | Not measured |
| Average aspect ratio | — | 1.5 (*1) | 2.0 (*1) | Not measured |
| Average layer thickness | nm | App. 3,000 (*2) | App. 5,000 (*2) | Not measured |
| Maximum layer thickness | nm | App. 90,000 (*3) | App. 110,000 (*3) | Not measured |
| Flexural elastic modulus | MPa | 2700 | 3100 | 4000 |
| Flexural strength | MPa | 97 | 123 | 135 |
| Deflection temperature under load | ° C. | 148 | 147 | 167 |
| Warpage | mm | 3.9 | 4.2 | 8 |
| Centerline average roughness | nm | 210 | 430 | 710 |
| Sink mark formation | mm | 1.60 | 1.60 | 1.60 |
| Water absorption | % | 0.5 | 0.5 | 0.5 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

Table 17 shows that neither talc nor mica conventionally used exhibited a sufficient reinforcing effect or sufficiently improved the heat resistance and the warpage, thus severely degrading the surface quality. Although the reinforcing effect could be achieved by adding glass fibers, the warpage was not sufficiently improved and the surface quality was severely degraded. Thus, none of COMPARATIVE EXAMPLES 22 to 24 achieved a satisfactory balance.

EXAMPLE 27 AND COMPARATIVE EXAMPLE 25

Polyamide resin A4, styrene resin B1, and the swelling mica obtained in SYNTHETIC EXAMPLE 1 or talc at the weight ratios set forth in Table 18 were melt-mixed using a twin shaft extruder (TEX 44 produced by Japan Steel Works, Ltd.) while adjusting the temperature to the dies to 280° C. to 300° C. from the initial stage of the mixing. The physical properties of the resulting polyamide resin compositions were evaluated. The results are shown in Table 18.

TABLE 18

|  |  | EXAMPLE 27 | COMPARATIVE EXAMPLE 25 |
|---|---|---|---|
| Polyamide resin A4 | Parts by weight | 55 | 55 |
| Styrene resin B1 |  | 45 | 45 |
| Clay J-2 |  | 8 |  |
| Talc |  |  | 6.5 |
| Ash content | wt % | 6.2 | 6.1 |
| Ratio of [D] ≤300 nm | % | 102 | 0 |
| Average [D] | nm | 132 | 2400 |
| Number of dispersed particles [N] | no./wt % · 100 μm² | 120 | 5 |
| Average aspect ratio | — | 125 | 1.5 (*1) |
| Average layer thickness | nm | 10 | App. 3,000 (*2) |
| Maximum layer thickness | nm | 41 | App. 90,000 (*3) |
| Flexural elastic modulus | MPa | 5700 | 3900 |
| Flexural strength | MPa | 153 | 129 |
| Deflection temperature under load | ° C. | 171 | 139 |
| Warpage | mm | 0.6 | 4.5 |
| Centerline average roughness | nm | 6 | 250 |
| Sink mark formation | mm | 1.60 | 1.40 |
| Water absorption | % | 0.3 | 0.3 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

Table 18 shows that the talc conventionally used did not exhibit a sufficient reinforcing effect or a sufficient warpage improvement. Thus, the surface quality was low.

EXAMPLES 28 TO 31 AND COMPARATIVE EXAMPLES 26 TO 29

Polyamide resin A1, anhydride-containing olefin copolymer C2, an ethylene-propylene-diene copolymer (EP96 produced by JSR Corporation), the swelling mica obtained in SYNTHETIC EXAMPLE 1, the swelling mica obtained in SYNTHETIC EXAMPLE 2, glass fibers, and mica at the weight ratios set forth in Table 19 were melt-mixed using a twin shaft extruder (TEX 44 produced by Japan Steel Works, Ltd.) while adjusting the temperature to 240° C. The physical properties of the resulting polyamide resin compositions were evaluated. The results are shown in Table 19.

TABLE 19

|  |  | EXAMPLES | | | | COMPARATIVE EXAMPLES | | | |
|---|---|---|---|---|---|---|---|---|---|
|  |  | 28 | 29 | 30 | 31 | 26 | 27 | 28 | 29 |
| Polyamide resin A1 | Parts by weight | 85 | 83.6 | 85 | 83.6 | 81 | 81 | 85 | 85 |
| Anhydride-containing olefin copolymer C2 |  | 5 | 5 |  |  | 5 | 5 | 5 | 5 |
| Ethylene-propylene-diene copolymer |  |  |  | 5 | 5 |  |  |  |  |
| Clay J-2 |  | 10 |  | 10 |  |  |  |  |  |
| Clay J-5 |  |  | 11.4 |  | 11.4 |  |  |  |  |
| Clay K-2 |  |  |  |  |  | 14 |  |  |  |
| Clay K-4 |  |  |  |  |  |  | 14 |  |  |
| Glass Fibers |  |  |  |  |  |  |  | 10 |  |
| Mica |  |  |  |  |  |  |  |  | 10 |
| Ratio of [D] ≤300 nm | % | 92 | 85 | 90 | 86 | Not measured | Not measured | Not measured | 0 |
| Average [D] | nm | 99 | 112 | 99 | 110 | Not measured | Not measured | Not measured | 2420 |
| Number of dispersed particles [N] | no./wt % · 100 μm² | 139 | 112 | 137 | 120 | Not measured | Not measured | Not measured | 3 |
| Average aspect ratio | — | 145 | 105 | 145 | 107 | Not measured | Not measured | Not measured | 1.5 (*1) |
| Average layer thickness | nm | 8 | 9.5 | 8 | 9.5 | Not measured | Not measured | Not measured | App. 2000 (*2) |
| Maximum layer thickness | nm | 30 | 41 | 29 | 40 | Not measured | Not measured | Not measured | App. 70,000 (*3) |
| Stiffness (flexural elastic modulus) | MPa | 4450 | 4210 | 4400 | 4150 | 3480 | 3620 | 4780 | 3360 |
| Warpage upon water absorption | mm | 1.5 | 1.6 | 5.9 | 7.8 | 3.1 | 3.4 | 24.3 | 5.7 |
| Surface quality (surface roughness) | nm | 4.4 | 6.8 | 5.0 | 6.0 | 10.2 | 9.5 | 650 | 230 |

TABLE 19-continued

|  |  | EXAMPLES | | | | COMPARATIVE EXAMPLES | | | |
|---|---|---|---|---|---|---|---|---|---|
|  |  | 28 | 29 | 30 | 31 | 26 | 27 | 28 | 29 |
| Melt heat stability After 5 min | ×10$^{-2}$ ml/sec | 27.3 | 28.6 | 28.7 | 30.1 | 45.6 | 38.9 | 34.5 | 37.6 |
| (Flow) After 15 min | ×10$^{-2}$ ml/sec | 27.9 | 29.0 | 29.1 | 30.4 | 89.5 | 68.3 | 35.2 | 38.0 |
| Color after 15 min |  | None | None | None | None | Yellow | Yellow | None | None |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

EXAMPLES 32 TO 37

Polyamide resin A1, anhydride-containing olefin copolymer C2, and the swelling mica obtained in SYNTHETIC EXAMPLES 1 at the weight ratios set forth in Table 20 were melt-mixed using a twin shaft extruder (TEX 44 produced by Japan Steel Works, Ltd.). The physical properties of the resulting polyamide resin compositions were evaluated. The results are shown in Table 20.

EXAMPLES 38 TO 41

Polyamide resin A1, anhydride-containing olefin copolymers C1 and C3, and the swelling mica obtained in SYNTHETIC EXAMPLES 1 at the weight ratios set forth in Table 21 were melt-mixed using a twin shaft extruder (TEX 44 produced by Japan Steel Works, Ltd.) at 240° C. The

TABLE 20

|  |  | EXAMPLES | | | | | |
|---|---|---|---|---|---|---|---|
|  |  | 32 | 33 | 34 | 35 | 36 | 37 |
| Polyamide resin A1 | Parts by weight | 89 | 80 | 60 | 94.2 | 80 | 65 |
| Anhydride-containing olefin copolymer C2 |  | 1 | 10 | 30 | 5 | 5 | 5 |
| Clay J-2 |  | 10 | 10 | 10 | 0.8 | 15 | 30 |
| Ratio of [D] ≦300 nm | % | 93 | 89 | 85 | 95 | 88 | 76 |
| Average [D] | nm | 98 | 98 | 103 | 84 | 118 | 136 |
| Number of dispersed particles [N] | no./wt % · 100 μm² | 142 | 136 | 128 | 160 | 126 | 105 |
| Average aspect ratio | — | 150 | 140 | 129 | 176 | 117 | 89 |
| Average layer thickness | nm | 7.5 | 8.8 | 9.5 | 6 | 12.5 | 15 |
| Maximum layer thickness | nm | 28 | 35 | 41 | 18 | 42 | 65 |
| Stiffness (flexural elastic modulus) | MPa | 5370 | 4010 | 2860 | 2950 | 5120 | 6780 |
| Warpage upon water absorption | mm | 1.8 | 1.4 | 1 | 3.6 | 1.2 | 0.8 |
| Surface quality (surface roughness) | nm | 3.0 | 3.5 | 4.9 | 0.6 | 4.8 | 6.0 |
| Melt heat stability After 5 min | ×10$^{-2}$ ml/sec | 29.1 | 25.2 | 19.4 | 36.2 | 24.3 | 18.3 |
| (Flow) After 15 min | ×10$^{-2}$ ml/sec | 29.3 | 25.9 | 22.1 | 36.3 | 25.8 | 23.1 |
| Color after 15 min |  | None | None | None | None | None | None | physical properties of the resulting polyamide resin compositions were evaluated. The results are shown in Table 21.

TABLE 21

|  |  | EXAMPLES | | | |
|---|---|---|---|---|---|
|  |  | 38 | 39 | 40 | 41 |
| Polyamide resin A1 | Parts by weight | 86 | 83 | 86 | 83 |
| Anhydride-containing olefin copolymer C1 |  | 5 | 5 |  |  |
| Anhydride-containing olefin copolymer C3 |  |  |  | 5 | 5 |
| Clay J-3 |  | 9 |  | 9 |  |
| Clay J-6 |  |  | 12 |  | 12 |
| Ratio of [D] ≦300 nm | % | 85 | 80 | 84 | 79 |
| Average [D] | nm | 116 | 120 | 118 | 119 |
| Number of dispersed particles [N] | no./wt % · 100 μm² | 118 | 105 | 120 | 110 |
| Average aspect ratio | — | 120 | 106 | 117 | 108 |
| Average layer thickness | nm | 9.6 | 11.5 | 10 | 11.8 |
| Maximum layer thickness | nm | 47 | 52 | 45 | 55 |
| Stiffness (flexural elastic modulus) | MPa | 4210 | 3890 | 4160 | 3820 |
| Warpage upon water absorption | mm | 1.8 | 2.2 | 1.9 | 2.3 |

TABLE 21-continued

| | | EXAMPLES | | | |
|---|---|---|---|---|---|
| | | 38 | 39 | 40 | 41 |
| Surface quality (surface roughness) | nm | 4.5 | 5.7 | 4.9 | 5.7 |
| Melt heat stability After 5 min | ×10⁻² ml/sec | 32.1 | 30.6 | 34.6 | 33.1 |
| (Flow) After 15 min | ×10⁻² ml/sec | 33.4 | 31.2 | 35.7 | 33.4 |
| Color after 15 min | | None | None | None | None |

EXAMPLES 42 TO 43

Polyamide resin A2, anhydride-containing olefin copolymer C2, and the swelling mica obtained in SYNTHETIC EXAMPLES 1 at the weight ratios set forth in Table 22 were melt-mixed using a twin shaft extruder (TEX 44 produced by Japan Steel Works, Ltd.) at 260° C. The physical properties of the resulting polyamide resin compositions were evaluated. The results are shown in Table 22.

TABLE 22

| | | EXAMPLES | |
|---|---|---|---|
| | | 42 | 43 |
| Polyamide resin A2 | Parts by weight | 85 | 83.6 |
| Anhydride-containing olefin copolymer C2 | | 5 | 5 |
| Clay J-2 | | 10 | |
| Clay J-5 | | | 11.4 |
| Ratio of [D] ≤300 nm | % | 93 | 88 |
| Average [D] | nm | 98 | 105 |
| Number of dispersed particles [N] | no./wt % · 100 μm² | 140 | 122 |
| Average aspect ratio | — | 145 | 107 |
| Average layer thickness | nm | 8.5 | 9.5 |
| Maximum layer thickness | nm | 32 | 40 |
| Stiffness (flexural elastic modulus) | MPa | 4620 | 4330 |
| Warpage upon water absorption | mm | 1.2 | 1.4 |
| Surface quality (surface roughness) | nm | 4.3 | 5.5 |
| Melt heat stability After 5 min | ×10⁻² ml/sec | 28.1 | 29.4 |
| (Flow) After 15 min | ×10⁻² ml/sec | 28.7 | 29.6 |
| Color after 15 min | | None | None |

The results above show that, with the swelling mica treated with the ammonium salt, the melt heat stability was low, and the flow of the resin was unstable, resulting in color development. With the glass fibers and the mica, the surface quality was impaired and warpage occurred. With the olefin copolymer containing no anhydride, the warpage property upon absorption of water was not sufficient. Thus, polyamide resin compositions of EXAMPLES exhibited a satisfactory balance between properties while none of COMPARATIVE EXAMPLES achieved a satisfactory balance.

EXAMPLES 44 TO 49

Polyamide resin A1, the swelling mica obtained in SYNTHETIC EXAMPLES 1, and carbon compounds G1 and G2 at the weight ratios set forth in Table 23 were melt-mixed using a twin shaft extruder (TEX 44 produced by Japan Steel Works, Ltd.) while adjusting the temperature to the dies to 220° C. to 250° C. from the initial stage of the mixing. The physical properties of the resulting polyamide resin compositions were evaluated. The results are shown in Table 23.

TABLE 23

| | | EXAMPLES | | | | | |
|---|---|---|---|---|---|---|---|
| | | 44 | 45 | 46 | 47 | 48 | 49 |
| Polyamide resin A1 | Parts by weight | 100 | 100 | 100 | 100 | 91 | 91 |
| Clay J-2 | | | 6.6 | 6.6 | 13.6 | | 6.6 | 13.6 |
| Clay J-6 | | | | | 18 | | |
| Carbon compound G1 | | | 3.5 | 4.5 | 4.5 | 4.5 | | |
| Carbon compound G2 | | | | | | | 9 | 9 |
| Ash content | wt % | 5.0 | 5.0 | 9.9 | 10.2 | 5.0 | 10.1 |
| Ratio of [D] ≤300 nm | % | 93 | 92 | 90 | 81 | 93 | 89 |
| Average [D] | nm | 98 | 99 | 104 | 117 | 99 | 106 |
| Number of dispersed particles [N] | no./wt % · 100 μm² | 146 | 144 | 135 | 113 | 145 | 130 |
| Average aspect ratio | — | 125 | 125 | 140 | 108 | 122 | 135 |
| Average layer thickness | nm | 8 | 8 | 8.5 | 9.5 | 7.5 | 8.5 |
| Maximum layer thickness | nm | 30 | 31 | 33 | 39 | 31.5 | 33 |
| Flexural elastic modulus | MPa | 4200 | 4150 | 5450 | 5100 | 4060 | 5400 |
| Flexural strength | MPa | 105 | 104 | 130 | 130 | 104 | 128 |
| Deflection temperature under load | ° C. | 130 | 131 | 145 | 139 | 129 | 143 |

TABLE 23-continued

|  |  | EXAMPLES | | | | | |
| --- | --- | --- | --- | --- | --- | --- | --- |
|  |  | 44 | 45 | 46 | 47 | 48 | 49 |
| Volume resistivity | Ω · cm | $1.9 \times 10^{11}$ | $3.2 \times 10^5$ | $9.4 \times 10^4$ | $7.5 \times 10^5$ | $4.2 \times 10^8$ | $2.1 \times 10^8$ |
| Warpage | mm | 1.6 | 1.5 | 1.3 | 1.6 | 1.6 | 1.3 |
| Mold shrinkage rate MD | % | 0.67 | 0.65 | 0.44 | 0.47 | 0.66 | 0.45 |
| TD |  | 0.69 | 0.68 | 0.49 | 0.53 | 0.69 | 0.49 |
| Centerline average roughness | nm | 2.5 | 2.6 | 4.0 | 4.0 | 2.0 | 3.4 |

(*1): Because dispersed particles were not lamellar, the ratio, major axis/minor axis, of the dispersed particles was determined.
(*2): Because dispersed particles were not lamellar, the number-average value of the minor axes of the dispersed particles was determined.
(*3): Because dispersed particles were not lamellar, the maximum value of the minor axis of the dispersed particles was determined.

COMPARATIVE EXAMPLES 30 TO 34

Polyamide resin A1, talc, mica, glass fibers, and carbon compound G1 at the weight ratios set forth in Table 24 were melt-mixed as in EXAMPLE 44. The physical properties of the resulting polyamide resin compositions were evaluated. The results are shown in Table 24.

EXAMPLES 50 TO 52

Polyamide resin A2, the swelling mica obtained in SYNTHETIC EXAMPLE 1, and carbon compounds G1 and G3 at the weight ratios set forth in Table 25 were melt-mixed using a twin shaft extruder (TEX 44 produced by Japan Steel Works, Ltd.) while adjusting the temperature to the dies to 230° C. to 260° C. from the initial stage of the mixing. The properties of the resulting compositions were evaluated, and the results are shown in Table 25.

TABLE 24

|  |  | COMPARATIVE EXAMPLES | | | | |
| --- | --- | --- | --- | --- | --- | --- |
|  |  | 30 | 31 | 32 | 33 | 34 |
| Polyamide resin A1 | Parts by weight | 100 | 100 | 100 | 100 | 100 |
| Talc |  |  |  | 11 |  |  |
| Mica |  |  |  |  | 11 |  |
| Glass fibers |  |  |  |  |  | 11 |
| Carbon compound G1 |  |  | 4.5 | 4.5 | 4.5 | 4.5 |
| Ash content | wt % | 0.0 | 0.0 | 10.0 | 9.9 | 9.9 |
| Ratio of [D] ≦300 nm | % | Not measured | Not measured | 0 | 0 | Not measured |
| Average [D] | nm | Not measured | Not measured | 2420 | 2580 | Not measured |
| Number of dispersed particles [N] | no./wt % · 100 μm² | Not measured | Not measured | 5 | 2 | Not measured |
| Average aspect ratio | — | Not measured | Not measured | 1.5(*1) | 1.5(*1) | Not measured |
| Average layer thickness | nm | Not measured | Not measured | App. 3,000(*2) | App. 3,000(*2) | Not measured |
| Maximum layer thickness | nm | Not measured | Not measured | App. 90,000(*3) | App. 90,000(*3) | Not measured |
| Flexural elastic modulus | MPa | 2700 | 2730 | 3010 | 4250 | 5400 |
| Flexural strength | MPa | 96 | 96 | 95 | 120 | 130 |
| Deflection temperature under load | ° C. | 69 | 70 | 72 | 90 | 148 |
| Volume resistivity | Ω · cm | $7.0 \times 10^{14}$ | $9.5 \times 10^5$ | $7.1 \times 10^5$ | $4.4 \times 10^5$ | $2.1 \times 10^5$ |
| Warpage | mm | 8.1 | 8.0 | 7.8 | 7.1 | 16.2 |
| Mold shrinkage rate MD | % | 1.59 | 1.60 | 1.43 | 1.01 | 0.56 |
| TD |  | 1.70 | 1.72 | 1.59 | 1.21 | 1.78 |
| Centerline average roughness | nm | 1.9 | 2.2 | 210 | 430 | 890 |

(*1)Because dispersed particles were not lamellar, the ratio, major axis/minor axis, of the dispersed particles was determined.
(*2)Because dispersed particles were not lamellar, the number-average value of the minor axes of the dispersed particles was determined.
(*3)Because dispersed particles were not lamellar, the maximum value of the minor axis of the dispersed particles was determined.

TABLE 25

|  |  | EXAMPLES | | |
| --- | --- | --- | --- | --- |
|  |  | 50 | 51 | 52 |
| Polyamide resin A2 | Parts by weight | 100 | 100 | 91 |
| Clay J-2 |  | 13.6 |  | 13.6 |
| Clay J-6 |  |  | 18 |  |
| Carbon compound G1 |  | 4.5 | 4.5 |  |
| Carbon compound G3 |  |  |  | 9 |
| Ash content | wt % | 9.9 | 9.8 | 10.1 |
| Ratio of [D] ≦300 nm | % | 81 | 36 | 80 |
| Average [D] | nm | 142 | 283 | 141 |
| Number of dispersed particles [N] | no./wt % · 100 µm² | 99 | 45 | 103 |
| Average aspect ratio | — | 106 | 50 | 106 |
| Average layer thickness | nm | 10.5 | 36 | 10.5 |
| Maximum layer thickness | nm | 51 | 165 | 50 |
| Flexural elastic modulus | MPa | 5580 | 4950 | 5410 |
| Flexural strength | MPa | 116 | 96 | 119 |
| Deflection temperature under load | ° C. | 141 | 131 | 143 |
| Volume resistivity | Ω · cm | $3.7 \times 10^5$ | $5.9 \times 10^5$ | $1.7 \times 10^8$ |
| Warpage | mm | 1.0 | 3.6 | 1.4 |
| Mold shrinkage rate  MD | % | 0.30 | 0.68 | 0.44 |
| TD |  | 0.32 | 0.72 | 0.50 |
| Centerline average roughness | nm | 4.5 | 7.3 | 3.5 |

COMPARATIVE EXAMPLES 35 TO 39

Polyamide resin A2, talc, mica, glass fibers, and carbon compound G1 at the weight ratios set forth in Table 26 were melt-mixed as in EXAMPLE 50. The physical properties of the resulting polyamide resin compositions were evaluated. The results are shown in Table 26.

TABLE 26

|  |  | COMPARATIVE EXAMPLES | | | | |
| --- | --- | --- | --- | --- | --- | --- |
|  |  | 35 | 36 | 37 | 38 | 39 |
| Polyamide resin A2 | Parts by weight | 100 | 100 | 100 | 100 | 100 |
| Talc |  |  |  | 11 |  |  |
| Mica |  |  |  |  | 11 |  |
| Glass fibers |  |  |  |  |  | 11 |
| Carbon compound G1 |  |  | 4.5 | 4.5 | 4.5 | 4.5 |
| Ash content | wt % | 0.0 | 0.0 | 10.0 | 10.0 | 10.0 |
| Ratio of [D] ≦300 nm | % | Not measured | Not measured | 0 | 0 | Not measured |
| Average [D] | nm | Not measured | Not measured | 2420 | 2580 | Not measured |
| Number of dispersed particles [N] | no./wt % · 100 µm² | Not measured | Not measured | 5 | 2 | Not measured |
| Average aspect ratio | — | Not measured | Not measured | 1.5(*1) | 1.5(*1) | Not measured |
| Average layer thickness | nm | Not measured | Not measured | App. 3,000(*2) | App. 3,000(*2) | Not measured |
| Maximum layer thickness | nm | Not measured | Not measured | App. 90,000(*3) | App. 90,000(*3) | Not measured |
| Flexural elastic modulus | MPa | 2900 | 2910 | 3200 | 4500 | 5500 |
| Flexural strength | MPa | 113 | 112 | 108 | 123 | 135 |
| Deflection temperature under load | ° C. | 80 | 81 | 86 | 97 | 148 |
| Volume resistivity | Ω · cm | $6.4 \times 10^{14}$ | $8.9 \times 10^5$ | $7.4 \times 10^5$ | $3.9 \times 10^5$ | $2.2 \times 10^5$ |
| Warpage | mm | 8.3 | 7.9 | 7.2 | 6.5 | 13.5 |
| Mold shrinkage rate  MD | % | 1.47 | 1.46 | 1.38 | 1.30 | 0.44 |
| TD |  | 1.56 | 1.54 | 1.49 | 1.41 | 1.56 |
| Centerline average roughness | nm | 2.0 | 2.2 | 200 | 430 | 700 |

(*1)Because dispersed particles were not lamellar, the ratio, major axis/minor axis, of the dispersed particles was determined.
(*2)Because dispersed particles were not lamellar, the number-average value of the minor axes of the dispersed particles was determined.
(*3)Because dispersed particles were not lamellar, the maximum value of the minor axis of the dispersed particles was determined.

EXAMPLES 53 TO 55

Polyamide resin A3, the swelling mica obtained in SYNTHETIC EXAMPLE 1, and carbon compounds G1 and G3 at the weight ratios set forth in Table 27 were melt-mixed using a twin shaft extruder (TEX 44 produced by Japan Steel Works, Ltd.) while adjusting the temperature to the dies to 280° C. to 300° C. from the initial stage of the mixing. The properties of the resulting polyamide resin compositions were evaluated, and the results are shown in Table 27.

TABLE 27

|  |  | EXAMPLES | | |
|---|---|---|---|---|
|  |  | 53 | 54 | 55 |
| Polyamide resin A3 | Parts by weight | 100 | 100 | 91 |
| Clay J-2 |  | 13.6 |  | 13.6 |
| Clay J-6 |  |  | 18 |  |
| Carbon compound G1 |  | 4.5 | 4.5 |  |
| Carbon compound G3 |  |  |  | 9 |
| Ash content | wt % | 9.8 | 9.8 | 10.1 |
| Ratio of [D] ≦300 nm | % | 88 | 37 | 89 |
| Average [D] | nm | 103 | 280 | 99 |
| Number of dispersed particles [N] | no./wt % · 100 μm² | 130 | 50 | 136 |
| Average aspect ratio | — | 142 | 52 | 145 |
| Average layer thickness | nm | 9 | 35 | 9.5 |
| Maximum layer thickness | nm | 35 | 165 | 36 |
| Flexural elastic modulus | MPa | 5090 | 4850 | 5180 |
| Flexural strength | MPa | 148 | 96 | 150 |
| Deflection temperature under load | ° C. | 188 | 123 | 190 |
| Volume resistivity | Ω · cm | $2.9 \times 10^5$ | $6.1 \times 10^5$ | $1.8 \times 10^8$ |
| Warpage | mm | 0.8 | 3.8 | 1.3 |
| Mold shrinkage rate MD | % | 0.35 | 0.68 | 0.34 |
| TD |  | 0.45 | 0.72 | 0.48 |
| Centerline average roughness | nm | 4.0 | 7.3 | 3.5 |

COMPARATIVE EXAMPLES 40 TO 44

Polyamide resin A3, talc, mica, glass fibers, and carbon compound G1 at the weight ratios set forth in Table 28 were melt-mixed as in EXAMPLE 53. The physical properties of the resulting polyamide resin compositions were evaluated. The results are shown in Table 28.

TABLE 28

|  |  | COMPARATIVE EXAMPLES | | | | |
|---|---|---|---|---|---|---|
|  |  | 40 | 41 | 42 | 43 | 44 |
| Polyamide resin A3 | Parts by weight | 100 | 100 | 100 | 100 | 100 |
| Talc |  |  |  | 11 |  |  |
| Mica |  |  |  |  | 11 |  |
| Glass fibers |  |  |  |  |  | 11 |
| Carbon compound G1 |  |  | 4.5 | 4.5 | 4.5 | 4.5 |
| Ash content | wt % | 0.0 | 0.0 | 10.0 | 10.0 | 10.0 |
| Ratio of [D] ≦300 nm | % | Not measured | Not measured | 0 | 0 | Not measured |
| Average [D] | nm | Not measured | Not measured | 2420 | 2580 | Not measured |
| Number of dispersed particles [N] | no./wt % · 100 μm² | Not measured | Not measured | 5 | 2 | Not measured |
| Average aspect ratio | — | Not measured | Not measured | 1.5(*1) | 1.5(*1) | Not measured |
| Average layer thickness | nm | Not measured | Not measured | App. 3,000(*2) | App. 3,000(*2) | Not measured |
| Maximum layer thickness | nm | Not measured | Not measured | App. 90,000(*3) | App. 90,000(*3) | Not measured |
| Flexural elastic modulus | MPa | 3200 | 3200 | 5150 | 5400 | 5810 |

TABLE 28-continued

|  |  | COMPARATIVE EXAMPLES | | | | |
| --- | --- | --- | --- | --- | --- | --- |
|  |  | 40 | 41 | 42 | 43 | 44 |
| Flexural strength | MPa | 150 | 150 | 135 | 137 | 140 |
| Deflection temperature under load | °C. | 130 | 130 | 135 | 139 | 148 |
| Volume resistivity | Ω · cm | $3.3 \times 10^{14}$ | $9.8 \times 10^5$ | $8.3 \times 10^5$ | $3.9 \times 10^5$ | $2.4 \times 10^5$ |
| Warpage | mm | 4.5 | 4.5 | 1.9 | 2.5 | 14.7 |
| Mold shrinkage rate MD | % | 1.01 | 1.01 | 0.54 | 0.45 | 0.32 |
| TD |  | 1.11 | 1.11 | 0.59 | 0.49 | 1.43 |
| Centerline average roughness | nm | 1.9 | 1.9 | 210 | 430 | 790 |

(*1) Because dispersed particles were not lamellar, the ratio, major axis/minor axis, of the dispersed particles was determined.
(*2) Because dispersed particles were not lamellar, the number-average value of the minor axes of the dispersed particles was determined.
(*3) Because dispersed particles were not lamellar, the maximum value of the minor axis of the dispersed particles was determined.

EXAMPLES 56 TO 58

Polyamide resin A4, the swelling mica obtained in SYNTHETIC EXAMPLE 1, and carbon compounds G1 and G3 at the weight ratios set forth in Table 29 were melt-mixed using a twin shaft extruder (TEX 44 produced by Japan Steel Works, Ltd.) while adjusting the temperature to the dies to 280° C. to 300° C. from the initial stage of the mixing. The properties of the resulting polyamide resin compositions were evaluated, and the results are shown in Table 29.

TABLE 29

|  |  | EXAMPLES | | |
| --- | --- | --- | --- | --- |
|  |  | 56 | 57 | 58 |
| Polyamide resin A4 | Parts by weight | 100 | 100 | 91 |
| Clay J-2 |  | 13.6 |  | 13.6 |
| Clay J-6 |  |  | 18 |  |
| Carbon compound G1 |  | 4.5 | 4.5 |  |
| Carbon compound G3 |  |  |  | 9 |
| Ash content | wt % | 9.5 | 9.6 | 10.1 |
| Ratio of [D] ≦300 nm | % | 103 | 45 | 97 |
| Average [D] | nm | 133 | 226 | 129 |
| Number of dispersed particles [N] | no./wt % · 100 μm² | 123 | 58 | 130 |
| Average aspect ratio | — | 120 | 59 | 133 |
| Average layer thickness | nm | 10.5 | 33 | 9.5 |
| Maximum layer thickness | nm | 40.5 | 138 | 35.5 |
| Flexural elastic modulus | MPa | 7200 | 5010 | 7290 |
| Flexural strength | MPa | 168 | 113 | 170 |
| Deflection temperature under load | °C. | 118 | 109 | 123 |
| Volume resistivity | Ω · cm | $4.8 \times 10^5$ | $6.1 \times 10^5$ | $2.8 \times 10^8$ |
| Warpage | mm | 1.0 | 3.9 | 1.2 |
| Mold shrinkage rate MD | % | 0.45 | 0.68 | 0.34 |
| TD |  | 0.54 | 0.73 | 0.45 |
| Centerline average roughness | nm | 4.2 | 6.4 | 3.0 |

COMPARATIVE EXAMPLES 45 TO 49

Polyamide resin A4, talc, mica, glass fibers, and carbon compound G1 at the weight ratios set forth in Table 30 were melt-mixed using a twin shaft extruder (TEX 44 produced by Japan Steel Works, Ltd.) as in EXAMPLE 56. The physical properties of the resulting polyamide resin compositions were evaluated. The results are shown in Table 30.

TABLE 30

| | | COMPARATIVE EXAMPLES | | | | |
|---|---|---|---|---|---|---|
| | | 45 | 46 | 47 | 48 | 49 |
| Polyamide resin A4 | Parts by | 100 | 100 | 100 | 100 | 100 |
| Talc | weight | | | 11 | | |
| Mica | | | | | 11 | |
| Glass fibers | | | | | | 11 |
| Carbon compound G1 | | | 4.5 | 4.5 | 4.5 | 4.5 |
| Ash content | wt % | 0.0 | 0.0 | 10.0 | 10.0 | 10.0 |
| Ratio of [D] ≦300 nm | % | Not measured | Not measured | 0 | 0 | Not measured |
| Average [D] | nm | Not measured | Not measured | 2450 | 2500 | Not measured |
| Number of dispersed particles [N] | no./wt % · 100 μm² | Not measured | Not measured | 5 | 2 | Not measured |
| Average aspect ratio | — | Not measured | Not measured | 1.5(*1) | 1.5(*1) | Not measured |
| Average layer thickness | nm | Not measured | Not measured | App. 3,000(*2) | App. 3,000(*2) | Not measured |
| Maximum layer thickness | nm | Not measured | Not measured | App. 90,000(*3) | App. 90,000(*3) | Not measured |
| Flexural elastic modulus | MPa | 4500 | 4600 | 4910 | 5500 | 5900 |
| Flexural strength | MPa | 159 | 161 | 135 | 140 | 149 |
| Deflection temperature under load | °C. | 84 | 85 | 88 | 100 | 121 |
| Volume resistivity | Ω · cm | $9.4 \times 10^{14}$ | $1.0 \times 10^5$ | $7.4 \times 10^5$ | $4.9 \times 10^5$ | $2.5 \times 10^5$ |
| Warpage | mm | 6.9 | 6.7 | 3.0 | 3.6 | 16.2 |
| Mold shrinkage rate MD | % | 1.45 | 1.43 | 1.48 | 1.00 | 0.29 |
| TD | | 1.53 | 1.54 | 1.55 | 1.09 | 1.45 |
| Centerline average roughness | nm | 1.9 | 2.0 | 240 | 440 | 890 |

(*1)Because dispersed particles were not lamellar, the ratio, major axis/minor axis, of the dispersed particles was determined.
(*2)Because dispersed particles were not lamellar, the number-average value of the minor axes of the dispersed particles was determined.
(*3)Because dispersed particles were not lamellar, the maximum value of the minor axis of the dispersed particles was determined.

EXAMPLES and COMPARATIVE EXAMPLES demonstrate that addition of carbon compounds to polyamide resins decreases the resistivity, but the balance between heat resistance and dimensional stability is not satisfactory. Addition of glass fibers can render heat resistance but causes anisotropic shrinkage, which leads to warpage, low dimensional stability, and low surface quality. The combination of talc and mica can render electric conductivity and dimensional stability but degrades surface quality. Accordingly, it is clear that none of the conventional techniques can provide a conductive material that can achieve satisfactory balance between electric conductivity, mechanical strength, heat resistance, surface quality of the product, mold shrinkage, and dimensional stability such as anisotropy and warpage.

INDUSTRIAL APPLICABILITY

As is described above, the swelling mica treated with the polyether compound according to the present invention achieves homogeneous, fine dispersion in the polyamide resin. Thus, a polyamide resin composition exhibiting low warpage, satisfactory dimensional stability, good surface appearance, improved mechanical properties, and high heat resistance can be obtained while achieving a satisfactory balance between these properties.

Moreover, addition of a styrene resin provides a polyamide resin composition that can exhibit superior surface appearance (surface quality and low sink mark formation) in addition to the above-described effects; addition of an anhydride-containing olefin copolymer provides a polyamide resin composition exhibiting low water absorption in addition to the above-described effects; and addition of a carbon compound can provide a polyamide resin composition having antistatic properties in addition to the above-described effects.

The invention claimed is:
1. A polyamide resin composition comprising polyamide resin and swelling mica treated with a polyether compound, wherein the polyether compound is represented by general formula (2):

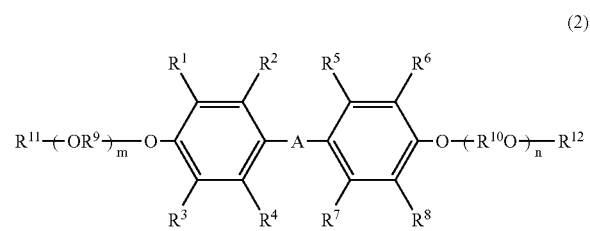

wherein -A- represents —O—, —S—, —SO—, —SO$_2$—, —CO—, an alkylene group having 1 to 20 carbon atoms, or alkylidene group having 6 to 20 carbon atoms; $R^1$, $R^2$, $R^3$, $R^4$, $R^5$, $R^6$, $R^7$, and $R^8$ may be the same or different and each represent a hydrogen atom, a halogen atom, or a monovalent hydrocarbon group having 1 to 5 carbon atoms; $R^9$ and $R^{10}$ may be the same or different and each represent a divalent hydrocarbon group having 1 to 5 carbon atoms; $R^{11}$ and $R^{12}$ may be the same or different and each represent a hydrogen atom or a monovalent hydrocarbon group having 1 to 20 carbon atoms; m and n each represent the number of oxyalkylene repeating units; and 2<m+n<50,
wherein the polyamide resin is one selected from the group consisting of nylon 6, nylon 46, nylon 66, nylon 11, nylon 12, nylon 9T and nylon MXD6.

2. The polyamide resin composition of claim 1, further comprising at least one selected from the group consisting of a styrene resin, an anhydride-containing olefin copolymer, and a carbon compound.

3. The polyamide resin composition of claim 1, further comprising a styrene resin.

4. The polyamide resin composition of claim 1, further comprising an anhydride-containing olefin copolymer.

5. The polyamide resin composition of claim 4, wherein the anhydride-containing olefin copolymer is obtained by copolymerization or graft reaction of olefin or an olefin copolymer with an alicyclic dicarboxylic anhydride having a cis double bond in the ring.

6. The polyamide resin composition of claim 4, wherein the content of the anhydride-containing olefin copolymer in the polyamide resin composition is in the range of 1 to 30 percent by weight.

7. The polyamide resin composition of claim 1, further comprising a carbon compound.

8. The polyamide resin composition of claim 7, wherein the carbon compound is in the form of particles.

9. The polyamide resin composition of claim 7, wherein the carbon compound is fibrous.

10. The polyamide resin composition of claim 1, wherein the ratio of the swelling mica having an equivalent circular diameter [D] of 300 nm or less in the composition is 20% or more.

11. The polyamide resin composition of claim 1, wherein the average of the equivalent circular diameter [D] of the swelling mica in the polyamide resin composition is 500 nm or less.

12. The polyamide resin composition of claim 1, wherein the average layer thickness of the swelling mica in the polyamide resin composition is 50 nm or less.

13. The polyamide resin composition of claim 1, wherein the maximum layer thickness of the swelling mica in the polyamide resin composition is 200 nm or less.

14. The polyamide resin composition of claim 1, wherein the number [N] of particles per unit weight ratio of the swelling mica in the polyamide resin composition is 30 or more.

15. The polyamide resin composition of claim 1, wherein the average aspect ratio (layer length/layer thickness) of the swelling mica in the polyamide resin composition is 10 to 300.

16. The polyamide resin composition of claim 1, the content of the swelling mica in the polyamide resin composition is in the range of 0.5 to 30 percent by weight.

17. The polyamide resin composition of claim 1, prepared by mixing these components.

18. A method for making a polyamide resin composition, comprising melt-mixing the components of the polyamide resin composition set forth in claim 1.

19. A molded resin article entirely or partially composed of the polyamide resin composition according to claim 1.

20. An automobile part entirely or partially composed of the polyamide resin composition according to claim 1.

21. A molded resin article entirely or partially composed of the polyamide resin composition according to claim 2.

22. An automobile part entirely or partially composed of the polyamide resin composition according to claim 2.

23. The polyamide resin composition of claim 4, wherein the anhydride-containing olefin copolymer is obtained by copolymerization or graft reaction of olefin or an olefin copolymer with an α, β-unsaturated dicarboxylic anhydride.

24. A method for producing a polyamide resin composition, comprising the steps of:
(I) mixing swelling mica, polar solvent containing water, and a polyether compound;
(II) drying the mixture obtained in the step (I); and
(III) melt-mixing a polyamide resin and the swelling mica treated with the polyether compound to produce the polyamide resin composition,
wherein the polyether compound is represented by the general formula (1):

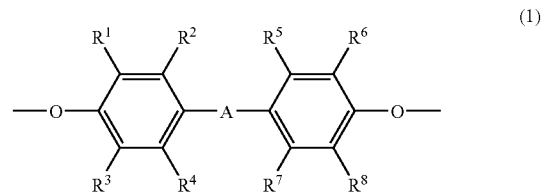

wherein -A- represents —O—, —S—, —SO—, —SO—$_2$, —CO—, an alkylene group having 1 to 20 carbon atoms, or alkylidene group having 6 to 20 carbon atoms; and $R^1$, $R^2$, $R^3$, $R^4$, $R^5$, $R^6$, $R^7$, and $R^8$ each represent a hydrogen atom, a halogen atom, or a monovalent hydrocarbon group having 1 to 5 carbon atoms, and the Rs may be the same or different.

* * * * *

UNITED STATES PATENT AND TRADEMARK OFFICE
CERTIFICATE OF CORRECTION

PATENT NO. : 7,259,196 B2 Page 1 of 1
APPLICATION NO. : 10/519544
DATED : August 21, 2007
INVENTOR(S) : Noriyuki Suzuki et al.

It is certified that error appears in the above-identified patent and that said Letters Patent is hereby corrected as shown below:

Column 22,
Line 3, change "200°" to --240°--.

Column 30,
Line 58, change "(Q.01" to --(0.01--.

Column 54,
Line 58, change "—SO—$_2$" to -- —SO$_2$— --.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,259,196 B2 |
| APPLICATION NO. | : 10/519544 |
| DATED | : August 21, 2007 |
| INVENTOR(S) | : Noriyuki Suzuki et al. |

It is certified that error appears in the above-identified patent and that said Letters Patent is hereby corrected as shown below:

Column 54,
Line 43, change "–SO–$_2$" to -- –SO$_2$– --.

Signed and Sealed this

Seventh Day of October, 2008

JON W. DUDAS
*Director of the United States Patent and Trademark Office*